US010708273B2

(12) United States Patent
Tan

(10) Patent No.: US 10,708,273 B2
(45) Date of Patent: Jul. 7, 2020

(54) PERVASIVE INTERMEDIATE NETWORK ATTACHED STORAGE APPLICATION WITH ASYNCHRONOUSLY RENDERED CONTENT

(71) Applicant: Anthony Tan, Las Vegas, NV (US)

(72) Inventor: Anthony Tan, Las Vegas, NV (US)

( * ) Notice: Subject to any disclaimer, the term of this patent is extended or adjusted under 35 U.S.C. 154(b) by 0 days.

(21) Appl. No.: 15/666,543

(22) Filed: Aug. 1, 2017

(65) Prior Publication Data
US 2017/0359353 A1   Dec. 14, 2017

Related U.S. Application Data

(63) Continuation-in-part of application No. 14/485,506, filed on Sep. 12, 2014, now Pat. No. 9,792,452.

(51) Int. Cl.
| | |
|---|---|
| *H04L 29/06* | (2006.01) |
| *G06F 21/62* | (2013.01) |
| *G06F 16/248* | (2019.01) |
| *G06F 16/22* | (2019.01) |
| *G06F 16/2457* | (2019.01) |
| *G06F 3/06* | (2006.01) |
| *G06F 16/182* | (2019.01) |
| *G06F 16/11* | (2019.01) |
| *G06F 16/176* | (2019.01) |

(52) U.S. Cl.
CPC ......... *H04L 63/102* (2013.01); *G06F 3/0605* (2013.01); *G06F 3/067* (2013.01); *G06F 3/0643* (2013.01); *G06F 3/0665* (2013.01); *G06F 16/122* (2019.01); *G06F 16/176* (2019.01); *G06F 16/1824* (2019.01); *G06F 16/2282* (2019.01); *G06F 16/248* (2019.01); *G06F 16/24575* (2019.01); *G06F 21/62* (2013.01); *G06F 21/6218* (2013.01); *H04L 63/083* (2013.01); *H04L 63/108* (2013.01); *G06F 2206/1008* (2013.01)

(58) Field of Classification Search
CPC ... H04L 63/102; H04L 63/083; H04L 63/108; G06F 17/30339; G06F 17/30528; G06F 17/30554; G06F 21/62
USPC .......................................................... 726/28
See application file for complete search history.

(56) References Cited

U.S. PATENT DOCUMENTS

| | | | |
|---|---|---|---|
| 2003/0115144 A1* | 6/2003 | Stefik ....................... | G06F 21/10 705/51 |
| 2010/0138396 A1* | 6/2010 | Kikkawa ............... | G06F 3/0608 707/674 |

(Continued)

FOREIGN PATENT DOCUMENTS

CN       102930227        2/2013

*Primary Examiner* — Andrew J Steinle
*Assistant Examiner* — Sakinah White Taylor
(74) *Attorney, Agent, or Firm* — Lightbulb IP, LLC

(57) ABSTRACT

A Pervasive Intermediate Network Attached Storage Application (PINApp) enables users to digitally assign (pin) a folder or drive to a public cloud storage service for the purpose of sharing their digital content with others. The PINApp enables users to engage the cloud storage services without the need to upload the digital content to the cloud in order for it to be viewed or shared. The Asynchronously Rendered Conduit (ARC) allows content owners to create rules to govern the private and public usage of digital content across users, devices, networks, and realms.

20 Claims, 18 Drawing Sheets

(56) References Cited

U.S. PATENT DOCUMENTS

| | | | |
|---|---|---|---|
| 2012/0060072 A1* | 3/2012 | Simitci | H03M 13/373 |
| | | | 714/756 |
| 2013/0013798 A1* | 1/2013 | Grube | H04L 65/4084 |
| | | | 709/230 |
| 2013/0311597 A1 | 11/2013 | Arrouye | |
| 2014/0040811 A1 | 2/2014 | Brahmanapalli | |
| 2016/0179618 A1* | 6/2016 | Resch | H04L 63/101 |
| | | | 714/764 |

* cited by examiner

PERVASIVE INTERMEDIATE NETWORK ATTACHED STORAGE APPLICATION WITH ASYNCHRONOUSLY RENDERED CONTENT

CROSS-REFERENCE TO RELATED APPLICATION

This application is a continuation-in-part of U.S. patent application Ser. No. 14/485,506, filed Sep. 12, 2014.

BACKGROUND OF THE INVENTION

1. Field of the Invention

This invention relates to connecting a folder or hard drive on a personal computing device to a public cloud service for the purpose of sharing digital content such as songs, pictures, videos, documents and other digital content, negating the need to upload the digital content to the public cloud.

2. Related Art

The devices, features, and functions described herein are intended to disclose a method to allow a folder hosted on a local device such as a personal computer or other smart-type device to be digitally associated with, or "pinned" to a public cloud service. Unlike existing "Network Attached Storage" (NAS) or "Personal Cloud Devices" (PCD), there is no hardware requirement beyond the use of a computer, smartphone or other computing device capable of accessing a public cloud service on the Internet. While NAS and PCD-type devices exist within the prior art, they rely on expensive hardware, firmware and other device-centric components to establish the network connectivity and enable a user to connect and share digital content (files, folders, videos, songs, pictures, etc.) through a public or private cloud service.

The Pervasive Intermediate NAS application (PINApp) described herein addresses the need for an efficient, cost effective and simple way for users to store and share their digital content using public cloud services, without the requirement to upload their digital content to the public cloud, and without the requirement to purchase an expensive NAS or PCD. Further, the PINApp negates the need for expensive cloud storage service subscription plans because digital content is stored on the user owned/managed device and not on the public cloud.

The PINApp creates a digital environment wherein a user can store their digital content on a device they own (computer, smartphone, tablet, etc.) and both access and share that digital content through a public cloud service without the need to upload the digital content to the cloud.

By allowing users to share their digital content without the need to upload it to the public cloud, the PINApp negates the need for expensive cloud storage subscription services. Further, the PINApp eliminates the need for a personal appliance such as a PCD or NAS device (such as a Western Digital "My Cloud") as the functional aspects of the NAS are hosted within the PINApp contained on the owner device (computer, smartphone, tablet, etc.) provided by the digital content owner. The PINApp significantly reduces the cost associated with storing and sharing digital content in the public cloud.

In one preferred embodiment, the PINApp enables the user to select a folder on a local computing device (such as a tablet, smartphone, pc or other) that can be associated digitally with a public cloud storage service. This "pinning" of a locally hosted folder to a public cloud allows the PINApp to utilize a user's existing cloud service provider to share digital content with recipients. By allowing a folder to be pinned to a public cloud service (like Dropbox or StoAmigo), more users can access and share digital content, while negating the need to subscribe to expensive cloud storage service contracts, or worry about the fee's associated with storage space in the cloud. Further, by pinning a folder that is physically located on the device owned by the user and not by the cloud provider, the digital content remains private, protected and in the direct control of the owner of the digital content, and not in the control of the cloud service provider.

The PINApp allows the user device to act as a NAS device, wherein digital content can be stored "off-cloud". This enhances the privacy and security aspects of the user digital content because it is not being hosted on a public cloud or server farm. Even if a user pins a folder to a public cloud service and shares the content of, or the entire folder with one or more recipients, the digital content remains on the user device in the sequestered NAS storage portion and is not uploaded to the public cloud, unless the user wishes to do so.

Prior art systems do not lend themselves to portability and do not address the need for a digital solution to enable sharing of digital content through public cloud services, without uploading the digital content to the specified public cloud service. Further, existing NAS-type devices are large, expensive and out of the financial reach of many cloud users. The PINApp negates the need for these physical NAS-type devices, while enabling digital content to be pinned from a local user device (such as a personal computer, smartphone or tablet) directly to the public cloud, protecting and restricting access to the digital content by others, while allowing the digital content owner to share with family and friends.

The PINApp can also be used as a unification software tool to allow one existing cloud storage service (Dropbox as an example) to be pinned directly to another (such as StoAmigo). The unification of these separate services would take place through the PINApp, utilizing a series of digitally associated folders. While the cloud storage services are entirely separate and managed independently, the PINApp can be utilized to unify two or more services for a user within their personal device(s). This would enable a user to (as an example) share a Google Drive folder or file with a Google Drive user, from StoAmigo's file storage and sharing platform.

The PINApp allows a user to select a "primary" and "secondary" public cloud service, wherein the user interface and command set of the primary public cloud service would be utilized to manage the digital content. The secondary public cloud service would appear in the primary public cloud service user interface screen as a folder, hosted within the primary public cloud service.

The PINApp utilizes the public API (Application Program Interface) provided by the public cloud storage services to enable digital content to easily be managed between two or more separate services from a user owned and managed device, such as a personal computer, laptop, smartphone or other smart-type computing device. The PINApp bridges the gap between the services, allowing the management of digital content to take place.

From the discussion that follows, it will become apparent that the present invention addresses the deficiencies associated with the prior art while providing additional advantages and benefits not contemplated or possible with prior art constructions.

SUMMARY OF THE INVENTION

A Pervasive Intermediate Network Attached Storage Application (hereinafter "PINApp") is described herein. The PINApp enables a user of a computing device (personal computer, smartphone, tablet, etc.) to designate a digital storage repository (file, folder, USB stick or other connected internal or external drive) to connect to the public cloud for the purpose of sharing their digital content. In one preferred embodiment, the PINApp may be downloaded and installed on a personal computing device such as a smartphone or a tablet, and be used to allow the owner of the smartphone or tablet to share their photos with another person. The PINApp would negate the need for the user to email or otherwise transfer their photos to the cloud, and enable them to share the photos directly with friends and family from their device using existing cloud storage and sharing services. By allowing users to share their digital content directly from their device, the PINApp negates the need for users to purchase expensive Local Area Network (LAN) connected PCD's or to subscribe to expensive cloud services. The PINApp allows the user to utilize the storage space on their computing device (or otherwise connected to their device such as an external hard drive) instead of the cloud or PCD storage space, saving upload time and the cost associated with paying for online (cloud) storage space or NAS devices and other "personal cloud" type devices.

The PINApp has two distinct and primary functions. The first is the ability to digitally associate or pin a local folder or device to a public cloud storage system (such as StoAmigo, Dropbox and others) to enable a user to access and share digital content that is stored on a local device (such as a hard drive, thumb drive, laptop, smartphone or other) through a public cloud storage service, negating the need to upload the digital content to the cloud to be accessed and shared. The second primary function of the PINApp is to allow the association (or pinning) of folders and digital content stored on one public cloud storage service (such as Dropbox) with another public cloud storage service (such as StoAmigo). More specifically, the PINApp allows a user to unify their cloud storage services by assigning a primary (such as StoAmigo) to enable the sharing and storage of digital content that is hosted on a secondary (such as Dropbox). The digital content hosted on a secondary (such as Dropbox) is not copied, moved or otherwise relocated to the primary (such as StoAmigo), rather a folder is placed in the primary (such as StoAmigo) to digitally associate the content stored on the secondary (such as Dropbox) with the primary (such as StoAmigo). Functionally, this relationship is managed by pinning the digital content stored in the secondary (such as Dropbox) to the primary (such as StoAmigo). By unifying these public cloud storage services, a user could engage in sharing and accessing digital content stored in one or more online locations (such as in Dropbox) through the user interface of their primary or host service (such as StoAmigo). Again, it's important to note that in either functional instance wherein a local folder is pinned to a public cloud storage service, or wherein the digital content of a secondary cloud storage is pinned to a primary cloud storage service, digital content is not moved, copied or otherwise relocated. The PINApp provides addressing information to associate the digital content stored across multiple platforms and devices so that it may be accessed via a single user interface on a chosen digital medium, such as a cloud storage service (i.e. StoAmigo, Dropbox, etc.).

In one preferred embodiment referencing the first primary function, the PINApp allows the user to digitally assign (or pin) a folder that is hosted on their computing device directly to the public cloud. This "pinned" folder enables the user to place digital content into the folder to be accessed and shared directly through the public cloud, negating the need for a designated PCD or NAS device. The digital content that is stored in the pinned folder can be shared with one or more recipients through a publically available cloud storage provider, but will remain on the local device, ensuring both privacy and security of the digital content. By allowing the digital content to be stored locally and not uploaded to the cloud, the PINApp bypasses expensive cloud storage service agreements because the PINApp negates the need to utilize the cloud service provider storage space. All of the digital content is stored on the device of the user/owner initiating the PINApp.

Digital content that is stored locally (as referenced above) can be accessed through the user interface of the public cloud service in which the folder or drive was pinned to. Specifically, if a user pins a folder from their smartphone to their StoAmigo cloud storage account, the pinned folder (hosted on their smartphone) will be accessible through the user interface of their StoAmigo cloud storage account. The digital content stored within the pinned folder will be accessed and managed as if it was being hosted on the public cloud storage service (StoAmigo) even though it is located on the users personal device (in this example a smartphone).

The PINApp bridges the privacy and security gap that currently exists within the cloud storage marketplace. Currently, sharing through the cloud is managed by either (a) uploading digital content to a cloud-based server, or (b) purchasing an expensive PCD or NAS device to connect to a private LAN at a home or office to facilitate sharing with one or more recipients through an existing cloud service provider.

The PINApp is a fully contained software algorithm and application that takes the place of the expensive NAS and PCD's by enabling users to share with and through public cloud systems, while ensuring the privacy and security of storing their digital content on a local device. Locally storing digital content ensures that it doesn't end up on a backup server in a cloud network where it can easily be accessed by other parties.

Specifically, many companies are developing PCD's to share digital content over the Internet. While these devices perform the basic functions to enable storage and sharing of digital content, the expense associated with purchasing these devices is a significant barrier to entry into the cloud market for users who do not have the financial capability to purchase these devices, yet need the privacy and security of keeping their digital content on their personal-user device while still sharing that content with recipients. Further, many of these devices are technically cumbersome to properly install and configure, causing many users to see other solutions to safely sharing digital content through the public cloud.

In one preferred embodiment, the PINApp can digitally assign a portion of the digital storage or memory on the computing device to function like a NAS device, enabling easy access as well as sharing, streaming, transmitting and receiving of digital content between parties. The PINApp addresses additional specific needs, including but not limited to, providing a safer and more secure way to share digital content using existing cloud service providers, while lowering the overall cost to do so.

As will be detailed below, the PINApp provides an alternative to traditional hardware centric NAS devices commonly sold and marketed as "Personal Cloud Devices"

or "Private Clouds", while enhancing the overall security of digital content being stored, shared and/or accessible within a digital environment.

In another preferred embodiment referencing the second primary function of the PINApp, the PINApp can be used to digitally associate (or pin) a folder hosted on a public cloud storage service (like Dropbox) to another public cloud storage service (like StoAmigo). The purpose of this function is to allow a user to unify their public cloud storage accounts, enabling them to access all of their digital content from a single user interface. The PINApp enables a user to designate a primary public cloud storage and sharing service (such as StoAmigo) wherein they will pin digital content that is currently stored on their other public cloud storage and sharing services (such as Dropbox).

The PINApp enables the digital association of folders, drives and services to take place between one another for the purpose of unifying digital content, resulting in easy access to digital content that is stored on local devices as well as publically available cloud storage and sharing services.

As stated previously in reference to primary functionality, the PINApp can be utilized to digitally associate (or pin) digital content stored on a local device such as a smartphone or tablet, and the digital content stored on a public cloud service such as Dropbox, to a primary public cloud storage service (as selected by the user) such as StoAmigo. More specifically, the digital content stored on a user owned device (such as a smartphone or tablet) and the digital content stored on a user managed Dropbox account can be unified and pinned to the user managed StoAmigo account.

The PINApp also provides an Asynchronously Rendered Conduit (ARC) capability that allows digital content to be accessed from connected devices (via PINApp) or to be accessible from non-connected devices residing outside the PINApp system. The ARC is designed to allow access to digital content across devices, networks, and domains, while providing both privacy and security for the digital content being accessed and/or engaged through the ARC.

The PINApp additionally provides a method in which an ARC can be created between two or more of the connected and/or unified devices (via PINApp) allowing digital content to be securely accessed, transferred, shared or viewed between the two or more devices. The ARC satisfies the need for both privacy and security between two or more devices, enabling the protection of digital content without the inherent need for encryption and/or other security methodologies.

The ARC technology allows a digital content owner or manager to create a profile that will determine the usage parameters that govern a piece of digital content such as a file, or a group of digital content such as a folder or the contents of an entire server or drive. The ARC profile contains information such as what file(s) are being managed through the ARC, what access rights are assigned to each individual user or groups of users, if the digital content usage will expire or lapse over time, and if the digital content may be moved from an original host location to a secondary location, or even a third party location. Additional controls and metrics applied to an ARC profile to govern the use of digital content are provided in this submission.

Unlike traditional systems that allow digital content to move between networks and devices, the ARC utilizes a unique addressing, access, and management scheme to allow the digital content owner to have greater control over their digital content, while enhancing the ability for this digital content to move between devices, networks, domains, and ultimately users.

The key to the ARC methodology is the encapsulation of all of the geographic, access, and management/rights data that controls the digital content into a single ARC profile, enabling the digital content owner to determine exactly how the content is used, where it may or may not reside and who (or whom) can have access. Moreover, the ARC manages the aspects of usage for digital content before, during, and after it has been relocated, moved, or even transferred to other user(s) within the PINApp system, or to an outside entity or location. The data controls within the ARC set the parameters of use as defined by the digital content owner, while protecting the ownership and control over the digital content by the digital content owner. These parameters are stored within the system as an ARC profile.

The ARC is uniquely suited to support management of digital content across both controlled and uncontrolled LAN and network environments, while enabling the digital content owner to maintain control over the digital content being managed with the ARC.

In one preferred embodiment, the ARC may be utilized to manage digital content that is hosted within the PINApp system or within a PINApp connected device, wherein access to the digital content is necessary for a person or group that is not the owner or manager of the subject digital content.

In another preferred embodiment, the ARC may control the above subject digital content after it has been accessed and/or otherwise transferred to a person or group that is not the owner or manager of the subject digital content. The ARC system is extremely well suited for use in applications wherein regulations (such as HIPAA) govern the control and privacy requirements for digital content such as patient data at hospitals, doctor's offices, and the like.

The ARC is intended to provide complete control over digital content across multiple realms, while allowing the content owner to pass digital content to one or more recipients or groups of recipients without limit, while maintaining the integrity of the digital content across transactions. This control allows digital content owners to maintain compliance with regulations (such as the aforementioned HIPAA regulations) when utilized in conjunction with commonly known best practices.

The ARC also provides the capability of enabling third party engagement with digital content that may be used in wholesale or retail-type sales transactions. In one preferred embodiment, the ARC may enable a redirect to a payment service (of the digital content owners choice) wherein the digital content being accessed will only be made available after a payment is made to the digital content owner for the content being requested by the recipient. In another preferred embodiment, the payment method required to access the digital content may take place directly within the ARC through a bank transfer or other electronically controlled financial transaction. Unlike existing paywalls and financial transactions, the ARC can be transported to a recipient negating the need for a recipient to navigate to a paywall, shopping cart, or other digital payment processing service. The ARC speeds up the process of accepting payment for digital content and/or services by eliminating the need for the recipient to navigate to a third party site, then back to the subject digital content.

Other systems, methods, features and advantages of the PINApp will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
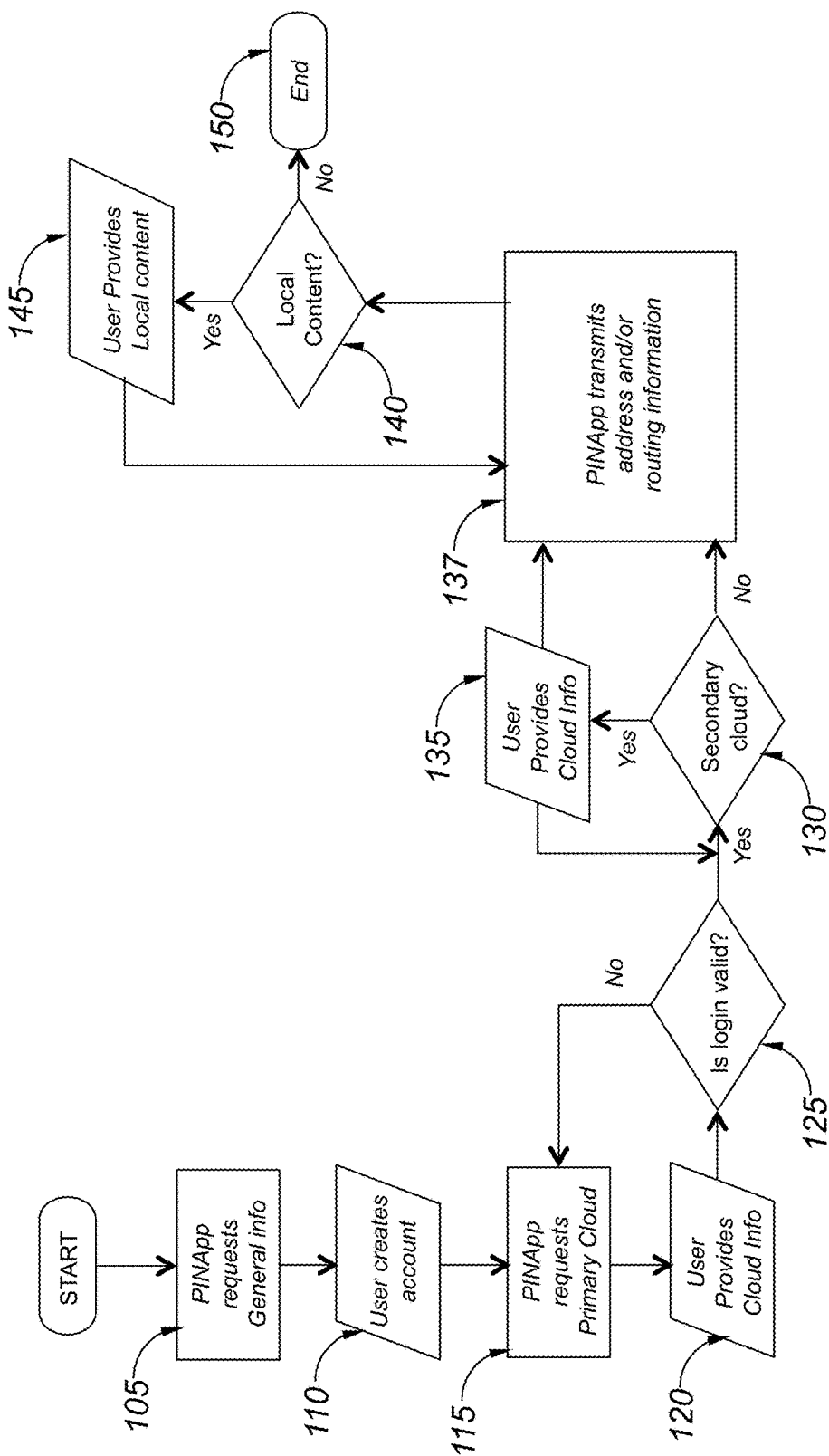
FIG. 1 is a flow diagram, depicting the general flow of the PINApp software functionality.

In the following description, numerous specific details are set forth in order to provide a more thorough description of the present invention. It will be apparent to one skilled in the art that the present invention may be practiced without these specific details. In other instances, well-known features have not been described in detail so as not to obscure the invention.

As previously stated, the PINApp provides two primary functions. The first primary function enables locally stored digital content (such as a folder on a smartphone, laptop or other) to be digitally associated or pinned to a public cloud storage service (such as Dropbox or StoAmigo), allowing the owner of the digital content to access the content through their public cloud storage service user interface (i.e. utilizing the user interface of StoAmigo to access digital content stored on a smartphone). The second primary function enables digital content stored in a public cloud storage service to be digitally associated or pinned to another public cloud storage service (i.e. pinning a folder hosted on Dropbox to StoAmigo) enabling the user to unify their digital content stored on public cloud services, selecting a primary public cloud service to access digital content stored on other services (i.e. utilizing StoAmigo as a primary user interface and cloud service to access digital content stored on Dropbox). Each of these primary functions will be described in detail in the following paragraphs.

The PINApp enables users of public cloud storage services (e.g. StoAmigo, Google Drive, Dropbox, etc.) to digitally assign a folder or drive hosted on a user-owned (local) device to the public cloud storage service. The digital assignment is facilitated utilizing the publically provided Application Program Interface (API) to allow the cloud storage service to see the content hosted on the user-owned device. The digital content on the user-owned device will be visible and accessible through the public cloud storage service, and can be shared with one or more recipients utilizing the tools existing within the public cloud storage service.

In one preferred embodiment, a digital content owner may have a USB drive that contains digital content that needs to be shared with one or more recipients. Typically, the digital content owner would be required to upload the contents of the USB drive to the public cloud storage service in order to share the content with one or more recipients. The PINApp negates the need for the upload step by enabling the public cloud storage service to see the digital content stored on the USB drive on the digital content owner's host device (such as a laptop).

In the above embodiment, the PINApp allows the USB drive to function as a NAS device by enabling the USB drive to connect directly to the subject public cloud storage service provider. Once the digital content that exists on the USB drive is visible to the public cloud storage service provider, it can be shared and accessed remotely utilizing the public cloud storage service provider tool set and user interface.

The PINApp is a software platform that employs a set of functional modules and algorithms to enable a local user device such as a smartphone, tablet, laptop or other computing device to engage with an existing cloud service, allowing storage and sharing of the digital content hosted on the local user device through the cloud service, negating the need for the digital content to be uploaded to the cloud.

Pinned digital content (such as a file, folder, drive or other storage component) can be accessed and managed through the user interface of the host service the digital content is being pinned to. As an example, if a folder hosted on a smartphone or tablet is pinned to a public cloud storage service (like StoAmigo), the user can access the pinned digital content by accessing their public cloud storage service. As the public cloud storage service user interface is accessed, the digital content that was pinned to the public cloud storage service will be visible. Specifically, the pinned digital content will appear as a folder in the directory listing shown in the user interface of the public cloud storage service.

The user can access the pinned digital content directly through the user interface of the public cloud storage service the digital content has been pinned to, enabling the user to share, rename, move, copy and execute other commands that are available through the public cloud storage service the digital content has been pinned to.

The directory structure of pinned content will remain the same as in the original host location of the digital content, much in the same manner one would experience when copying a folder from one local device (such as a USB hard drive) to a personal computer. The copied folder (from the USB hard drive) would be a subdirectory of the host device (in this case, the personal computer). It's important to note that while reviewing the following figures, the directory structure shown in the examples can be changed at any time by the user incorporating the PINApp. The directory structure given in the examples is for explanation purposes only, to provide clarity and ease of explanation.

The PINApp utilizes existing public cloud services (such as StoAmigo, Dropbox, SugarSync, etc.) to enable users to unify their digital content among their devices and services to ease storage and sharing mechanics of digital content stored across multiple devices and platforms. The PINApp utilizes the public API to provide detailed information pertaining to digital content being unified to allow the management of digital content stored across multiple platforms and devices to be accessible through a public cloud service.

It's important to note that the PINApp does not move digital content between devices and public cloud storage platforms. The PINApp provides addressing information to enable all of a user(s) digital content to appear to be stored in the same location, even though it may be spread out across multiple devices and/or multiple cloud storage platforms.

The following discussion will illustrate the basic command flow of the PINApp, relating to the unification of digital content. The following discussion assumes the PINApp software has been installed on a user device (such as a smartphone, laptop computer or other computing device) capable of accessing the user(s) public cloud storage and sharing service.

FIG. 1 illustrates the flow diagram of the PINApp. The initial actuation of the PINApp will prompt the user to enter data at a step 105 pertaining to username, password and other identifiers to ensure the privacy and authentication of the user engaging the PINApp. The user will respond by creating a user account at a step 110 containing their username and password information, along with other identifiers to ensure privacy.

Once the user has created an account at step 110, they will be prompted by the PINApp to select a primary public cloud service at a step 115. This cloud storage service, designated as primary, will be utilized by the PINApp as the host for all subsequent digital content to be pinned or otherwise digitally associated and unified. The primary public cloud service can be changed at any time in the settings menu within the PINApp. The query for primary and secondary cloud services will only take place upon the initial installation and actuation of the PINApp. All subsequent instances will assume the choices previously entered by the user. Once the host primary cloud storage service has been designated, all pinned digital content will be accessible and available through the host cloud storage service(s) user interface. It's important to note that the PINApp does not need to be present on the device accessing the public cloud storage service, but it must be running on one of the user devices that are associated with the pinned digital content. As an example, a user may wish to install and execute the PINApp on a device that is constantly on (such as a smartphone) to ensure the digital content associated through the PINApp remains available at all times. Should an instance occur wherein the device running the PINApp is disabled, the digital content that has been unified through, or otherwise pinned utilizing the PINApp will be unavailable.

The user will now input their primary public cloud storage service info at a step 120, including the access information (e.g., a username and password) to allow PINApp to engage the public cloud storage service to unify the users local storage devices and other public cloud services. Once the user has entered the primary public cloud storage service info at step 120, PINApp will verify the information is valid at a step 125 by establishing a connection with the primary public cloud storage service. If the information provided by the user at step 120 is not valid as determined at step 125, the PINApp will again request the user enter their primary public cloud storage information at step 115. Once the public cloud storage information entered at step 120 is validated at step 125, the PINApp will query the user for any secondary cloud storage information at a step 130. The secondary cloud storage information queried at step 130 would include any public cloud storage service that the user is currently storing digital content on, that they wish to access through their primary cloud storage service entered in step 120. The secondary cloud storage service will serve as a repository for storage only, while the primary cloud storage service (selected in step 120) will serve as the user interface and access point for all digital content unified using the PINApp.

If the user has entered any secondary cloud storage services at step 130 they wish to engage using the PINApp, that information will be entered at a step 135. The PINApp will query the user about other secondary cloud storage services at step 130 until the process of entering them at step 135 has been completed. Once complete, the PINApp will begin querying the user for local content at a step 140 to be pinned. The local content can be any folder, device or drive that the user wishes to access from their primary cloud storage service (entered in at step 120). It's important to note that the PINApp will not upload or otherwise copy any of the digital content from any device or any cloud storage to the other. The PINApp will provide addressing and access information at a step 137 to the primary public cloud storage service to enable the user to access all of their digital content from the primary public cloud storage service, utilizing any of their devices capable of engaging the service. The user can enter at a step 145 their local content to be pinned to the primary cloud storage service (selected in step 120) at this point. The PINApp will query the user for additional local content at step 140 to be pinned until the user has completed entering the information. Once the user has entered all of their local content at step 145, the setup is complete at a step 150.

Now that the user has pinned their digital content to a single host location (the primary public cloud storage service), all of their pinned digital content can be accessed from any of their smart-type devices by logging into their primary public cloud storage service. Each pinned entity (such as a folder hosted on a PC, or another public cloud service folder) will be listed within the primary directory listing shown on the user interface of the primary public cloud storage service.

The user can choose to un-pin their content as well as change their pinned folders at any time. By enabling a user to pin or unpin digital content at any time, the user can easily make digital content available for sharing without the inherent risk associated with uploading and storing the digital content on the public cloud.

Figure 2:
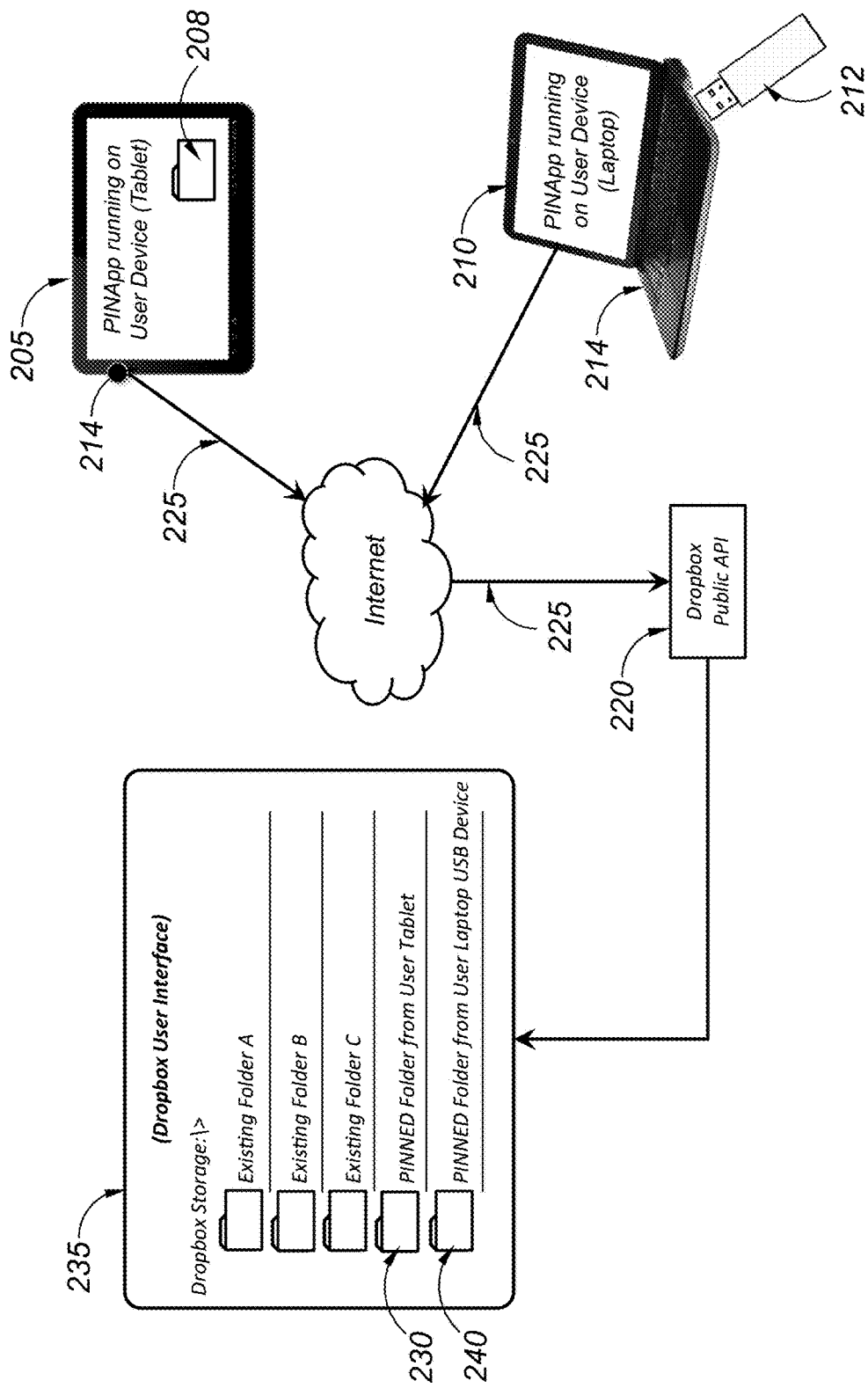
FIG. 2 is a functional application drawing, detailing a primary functionality of the PINApp.

FIG. 2 discusses the physical architecture of the "pinning" function, and the process in which a local folder on a user device can be digitally associated with a public cloud service. To ease the understanding of the following discussion, we will use Dropbox as the public cloud service provider, and we will explain examples wherein digital storage repositories such as folders and USB drives may be pinned to the public cloud service (Dropbox) to allow the sharing of digital content that is not stored on the cloud (i.e. online servers). It's important to note that while the following example uses Dropbox as the public cloud service provider, the PINApp is designed to interact with any cloud service provider that utilizes a publically available API (Application Program Interface) to allow third party applications to be utilized to manage or enhance the cloud storage service. The functional application aspects of the PINApp will now be discussed with reference to FIG. 2. It's important to note that the PINApp is operating system agnostic, so the user devices discussed in FIG. 2 (tablet 205 and laptop 210) can be utilizing any commonly known operating system to connect to the Internet and perform their basic functional and operational command sets.

As can be seen in FIG. 2, the PINApp has been installed and is running on a user device 205 such as a tablet. The owner of the tablet is using a public cloud service, in this case, Dropbox. The owner of the tablet 205 wishes to pin a folder 208 that is located on the tablet 205 to their Dropbox account for the purpose of sharing the digital content of the folder 208 with one or more recipients. Once the PINApp is launched on the tablet 205, the tablet owner can use their existing Dropbox login and account info to access their Dropbox account. Once the account access has been established, the tablet owner will select the folder 208 to pin to their Dropbox account. The PINApp will access the Dropbox Public API 220 through an Internet connection 225 to provide the physical address information for the folder 208 being pinned from the owner's tablet 205. The information shared with the Dropbox Public API 220 will enable Dropbox (the cloud storage provider) to add the folder 208 containing the digital content from the tablet 205 to their user interface 235, allowing the folder 230 to appear in the user interface 235. The digital content contained in the folder 208 on the tablet 205, represented in the user interface 235 by reference 230 can now be managed and shared, just as if it were to actually exist on the Dropbox web server. The digital content stored in the folder 208 never actually leaves the tablet 205, but rather is accessible for sharing through a system of addresses provided through the PINApp software and algorithm.

In a similar fashion as detailed above, the user may wish to pin digital content that is hosted on a USB device 212 connected to a laptop computer 210 that is running the PINApp software. As the owner of the laptop 210 establishes a connection with their Dropbox service through the Internet connection 225 via a network interface 214 or other communication device, the PINApp software connects with the Dropbox Public API 220 to provide addressing and routing information, providing the Dropbox server with the necessary data to allow the digital content hosted on the USB device 212 to be displayed in the Dropbox user interface 235 as shown in reference 240. Here again, the contents of the USB device 212 never leave the USB device 212, but rather are made accessible for sharing through the PINApp software and algorithm.

It's important to note that if either device (the tablet 205 or the laptop 210 running the USB device 212) is off-line, the folders 230 and 240 displayed in the Dropbox user interface 235 will still be shown in the Dropbox user interface 235, but will be inaccessible, and remain inaccessible until such a time as the devices (tablet 205 and laptop 210 with the USB device 212) are brought back online. Likewise, if the USB device 212 is disconnected from the laptop 210, the folder 240 on the Dropbox user interface 235 will still be listed, but the digital content contained in the USB device 212 will be unavailable.

The PINApp utilizes a command set that communicates with the public API of the subject cloud storage service to allow the digital content stored and controlled by the user(s) local device (e.g. laptop or smartphone) to be accessible through the cloud storage service.

As previously stated, the PINApp is a software application that can be installed on one or more devices such as smartphones, tablets, personal computers and other computing and/or smart-type devices, and interface with a cloud storage provider to share digital content stored on one or more of these personal computing devices. The system level components of the PINApp control the method in which the user device interacts with the cloud storage service(s) to ensure the privacy and security of the digital content residing on the device remains intact. Specifically, the digital content stored on the device being connected to the cloud service through the PINApp is not uploaded to the cloud server. The digital content can remain safely on the user device and still be shared through the public cloud service. The primary functional and architectural components and modules of the PINApp will now be discussed with reference to FIG. 3. It's important to note that while other aspects of operation and functionality exist within the PINApp system, they have been purposely omitted to provide focus and clarity for the primary functional elements.

Figure 3:
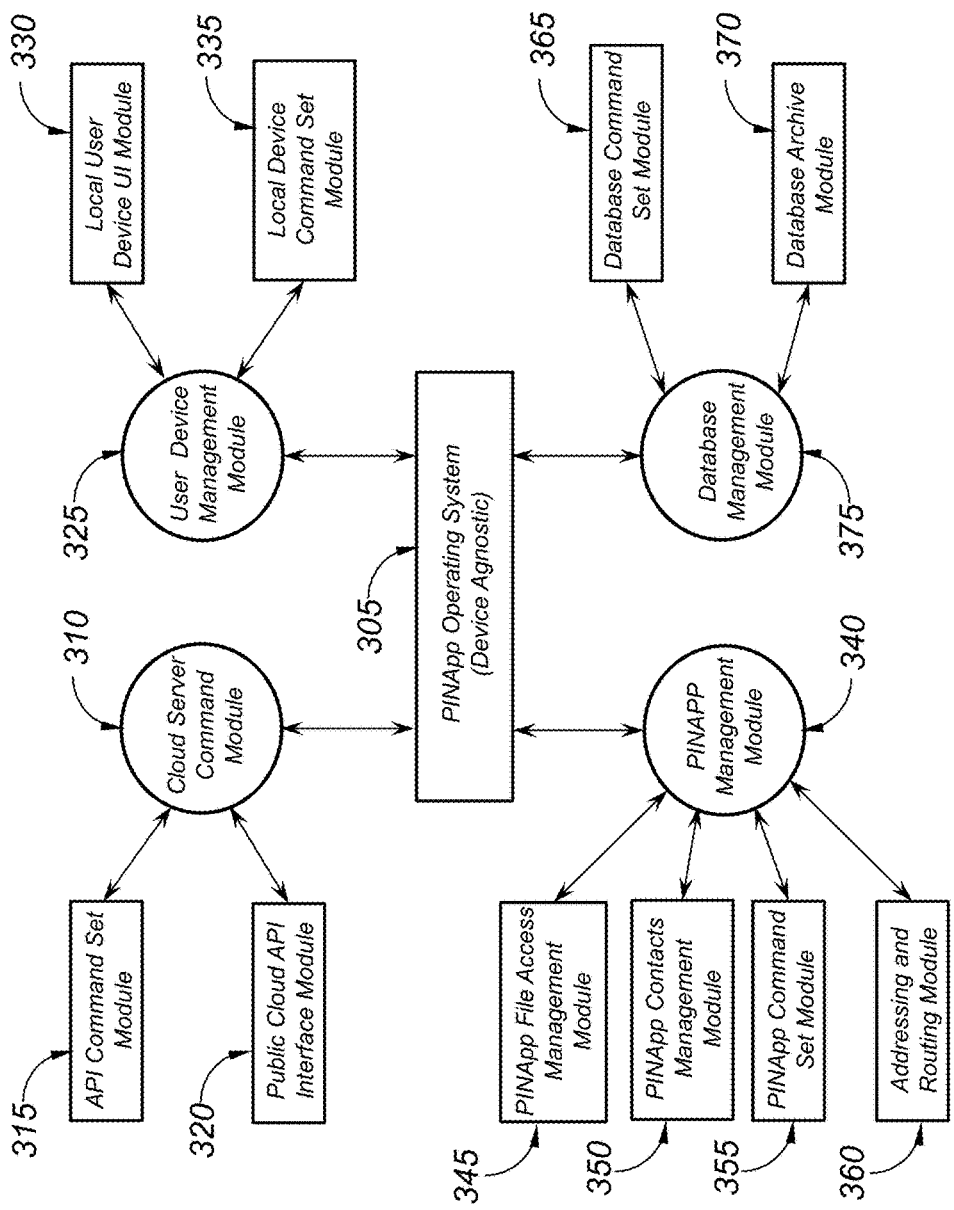
FIG. 3 is a block diagram detailing the functional modules and key components of the PINApp.

As can be seen in FIG. 3, the PINApp comprises of a series of software modules that work in conjunction to provide the infrastructure required to facilitate operation. The center of the PINApp is the device agnostic Operating System 305. The Operating System 305 governs the overall operation of the PINApp to ensure balance and synergy between respective modules. All functional aspects are managed and routed by the device agnostic operating system 305 of the PINApp. Each functional module (detailed below) communicates and performs primary functionality through the PINApp operating system 305.

The PINApp operating system 305 has four primary modules that work in conjunction with each other and the PINApp operating system 305 to connect the user device where the PINApp is installed with the cloud service provider(s). These four primary modules are the cloud server command module 310, the user device management module 325, the PINApp management module 340, and the database management module 375. The following paragraphs will detail the function of each.

The cloud server command module 310 is primarily responsible for managing and routing information and communication that enter and leave the PINApp from the external cloud service provider. The cloud server command module 310 employs the API command set module 315 and the public cloud API interface module 320 to manage commands as they are sent to, and received from, the external cloud service provider. The API command set module 315 permits the execution of commands such as copy, share, move files, etc. The public cloud API interface module 320 manages the connection between the PINApp operating system 305, the internal functional and operational commands and communication within the PINApp and the interface to the public cloud storage server(s).

The user device management module 325 is responsible for managing the communications and command sets that govern the installation and functional operations that take place on the user device (such as a smartphone, tablet, laptop, etc.). The user device management module 325 incorporates the local user device UI module 330 that controls command sets running on the local device. The local user device UI module 330 allows the input of commands from the user of the local device to be entered into the PINApp. These commands are subsequently routed through the user device management module 325 into the PINApp operating system 305 for distribution to the associated modules. The local device command set module 335 is responsible for interpreting the commands being entered into the local user device UI module 330. Since the PINApp is device agnostic, the local device command set module 335 will interpret commands from Android, iOS, Windows, Linux, MAC and other commonly known operating systems. These commands are translated through the user device management module 325 for routing and management through the PINApp operating system 305.

Continuing to refer to FIG. 3, the PINApp management module 340 controls the primary operational functionality of the PINApp. The primary functions to be discussed are the PINApp file access management module 345, the PINApp contacts management module 350, the PINApp command set module 355 and the addressing and routing module 360. All functional operations performed through the PINApp are managed through the PINApp management module 340. As with all other primary functional modules, the PINApp management module 340 communicates directly through the PINApp operating system 305.

The PINApp file access management module 345 is responsible for controlling access and commands associated with the files and folders managed within the PINApp. This module interprets the commands entering the PINApp management module 340 from other areas of the PINApp. As an example, if a command were to come into the PINApp from an external cloud service API (via the public cloud API interface module 320) the command would be routed from the cloud server command module 310, through the PINApp operating system 305 into the PINApp management module 340. At this point, the command would reach the PINApp file access management module 345 for acknowledgement and processing within the PINApp system. The PINApp file access management module 345 contains important permission and access information about the files and folders managed within the PINApp.

The PINApp contacts management module 350 allows the PINApp to work in conjunction with the cloud service provider contact management to govern access to the files and folders managed within the PINApp. Only person(s) who have been granted permission to the digital content managed through the PINApp will appear in the PINApp contacts management module 350. This ensures the PINApp can protect and restrict access to the digital content. The recipient of shared digital content (as an example) would be listed in both the PINApp contacts management module 350 and the external cloud service contact database to ensure the proper recipient is granted access to the digital content, while others are restricted.

The PINApp command set module 355 processes all the actions that take place outside of the PINApp. Specifically, if a command for a file or folder enters the PINApp from a cloud service provider, that command is managed by the PINApp command set module 355. As an example, if a user of the PINApp pins a folder to a public cloud service, that folder can be accessed from the public cloud server user interface. As a command from the public cloud server user interface (such as a view command) enters the PINApp, it will appear at the public cloud API interface module 320 and be interpreted based on the API command set module 315. That command is then routed through the cloud server command module 310 into the PINApp operating system 305. The operating system will route the command to the PINApp management module 340, which in turn will route the command to the PINApp command set module 355. The PINApp command set module will interpret the command coming in from the public cloud server user interface as a "view" command, then provide the addressing and routing module 360 (discussed below) with the appropriate information to allow the addressing and routing module 360 to interface with the database management module 375 (discussed below) to access the associated file for viewing. The PINApp command set module 355 also provides information pertaining to permissions and access rights, based on the information received from the PINApp file access management module 345.

As referenced above, the addressing and routing module 360 processes information that pertains to the folder that has been pinned to the public cloud storage server. Functional aspects of file and folder management such as adding and removing files from a folder, or folders from the system are managed through the addressing and routing module 360.

The final subsystem module contained within the PINApp is the database management module 375. The database management module 375 provides all of the location data for each file, folder, drive and system being managed by the PINApp. The database management module 375 engages the operating system 305 to allow the subset commands to engage the files and folders managed within the system. The database command set module 365 is responsible for tracking and communicating information related to the digital content such as basic access rights, permissions and other digital content related parameters. The database archive module 370 contains all of the database information pertaining to where the digital content is stored. Content stored in the PINApp on the local user device, as well as content stored on external cloud storage servers is managed through the database archive module 370. Any commands, actions or management functions that occur to any file, folder, drive or other system being managed by the PINApp will be stored in the database archive module 370, as well as the addressing information for the external digital content managed through the PINApp.

The above referenced functional modules of the PINApp work in conjunction with the local user device and the external cloud storage service to enable a user to digitally "pin" a folder, drive or system to a public cloud service.

The PINApp may be executed on one or more processors of various computing or other devices, such as the laptop or tablet devices discussed above. Communications with other devices, such as data storage services and other user devices will typically occur through one or more communication devices, such as wired or wireless network or other communication interfaces capable of communicating via one or more communication protocols.

As discussed with reference to FIG. 3 above, the PINApp employs a modular approach to manage functions needed to support the pinning (or digital association) of content stored across multiple devices and multiple platforms for the purpose of unifying digital content. The following FIG. 4 will provide a functional discussion as to the implementation of these modules in an application wherein digital content stored on a personal device (such as a smartphone, tablet, hard drive or USB drive) is pinned to a public cloud storage service.

Figure 4:
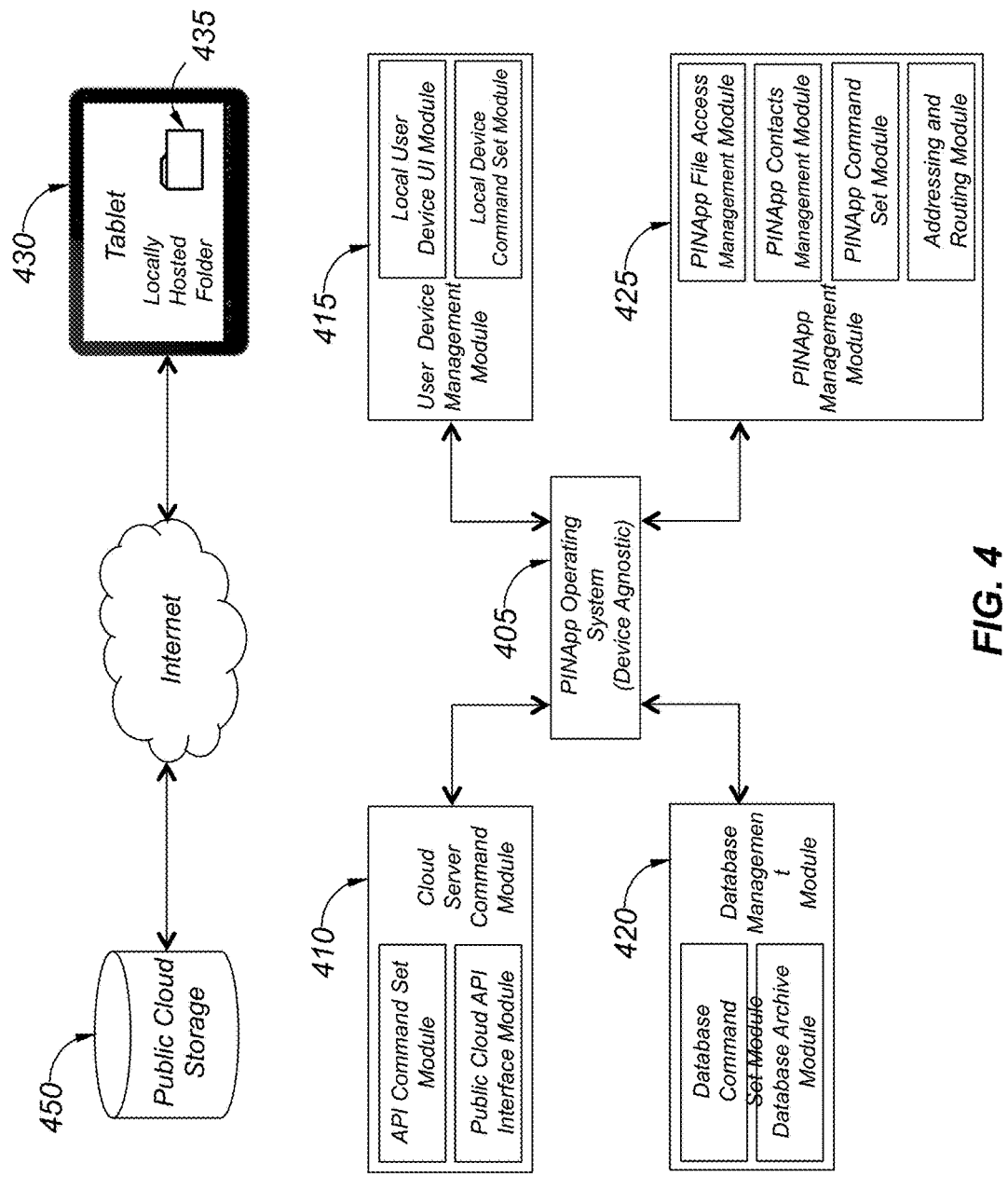
FIG. 4 is a block diagram detailing the interaction of the functional modules of the PINApp.

FIG. 4 is a representation of the interaction of the functional modules of the PINApp. As stated previously, the PINApp utilizes a modular approach (cloud server command module 410, user device management module 415, database management module 420 and PINApp management module 425) to management of all functions to ensure primary functional requirements are met. Each module performs a specific function, and interacts with the PINApp's device agnostic operating system 405 to perform the function of unifying digital content stored across multiple devices and platforms.

The following discussion in FIG. 4 referencing the interaction of the functional modules of the PINApp assumes the PINApp has been installed on the tablet 430 pictured in FIG. 4. Additionally, the following discussion in reference to FIG. 4 assumes the PINApp has been configured with the user's personal information and their cloud storage service choices have been made. These configuration settings are discussed previously in this submission with reference to FIG. 1.

Referring to FIG. 4, a file folder 435 is hosted on a tablet 430 device that is owned by a typical user (not pictured). The user wishes to pin the file folder 435 to the public cloud storage 450 service. As previously stated, pinning digital content (such as file folder 435) to the public cloud storage service (such as reference 450) enables the user to share the file folder 435 and its contents with other users (such as friends, family, coworkers or other) while negating the need to upload the digital content (file folder 435) to the public cloud storage service (450). Pinning the file folder 435 to the public cloud storage service 450 will also enable the owner of the tablet 430 to access the file folder 435 from other devices (such as smart phones, laptops, PC's and other computing devices) capable of communicating with public cloud storage service 450.

The pinning process happens through the PINApp wherein the user of tablet 430 accesses the local PINApp menu (not pictured), to begin the pinning operation. The user will provide detailed information to the PINApp such as the digital content to be pinned (in this case, file folder 435) and the location in which to pin the digital content (in this case, public cloud storage 450). The PINApp will provide the associated addressing and routing information required to access each. The command sequence will enter PINAPP through the user device management module 415. This module controls the local user device user interface as well as the command set available to the user of the local device. In this example, the user device management module 415 is providing command sets and user interface functionality that is compatible with the tablet 430 hosting the digital content to be pinned.

The command sequence will be routed through the PINApp device agnostic operating system 405. As the command sequence is interpreted, the operating system 405 will communicate directly with the cloud server command module 410 to ensure that a connection exists between the PINApp and the public cloud storage 450 service. Once that determination is made, the PINApp will notify the database management module 420, indicating that digital content (file folder 435) will be pinned (digitally associated) with public cloud storage 450. The database management module 420 will store the information and communicate to the PINApp management module 425, requesting addressing and routing information for the digital content to be pinned (in this case, file folder 435). The PINApp management module 425 will return the routing and addressing information to the database management module 420 where it will be stored. This information will also be routed through the PINApp operating system 405, through the cloud server command module 410 to the public cloud storage service 450. The addressing and routing information provided to the public cloud storage 450 service will enable the service to list the contents of the file folder 435, as if it was being stored in the public cloud storage service 450, even though it remains hosted on the tablet 430.

At this point, if the user were to log into the public cloud storage 450 service, the directory listing would show the file folder 435 and the associated digital content hosted in the folder.

The file folder 435 hosted on the tablet 430 is now digitally associated (or pinned) to the public cloud storage service 450. The user may now engage in sharing the file folder 435 with others such as friends, family, coworkers, etc. The sharing and file management functions are all controlled by the public cloud storage service 450, and governed by the functional feature set available through the public cloud storage service 450. The attributes assigned to the file folder 435 by the public cloud storage service 450 will be stored in the PINApp management module 425. As an example, now that the digital content (file folder 435) has been pinned to the public cloud storage service 450, the user (owner of the tablet 430) decides they want to share the file folder 435 with a friend.

The owner of the tablet 430 can access their public cloud storage service 450 outside of the PINApp and see their file folder 435 listed in the directory listing of the public cloud storage service 450 user interface. The owner can execute a command through the public cloud storage service 450 to share the file folder 435, just as they would if the folder 435 is hosted on the public cloud storage 450. Once the sharing command is executed, the PINApp will recognize the addressing information coming into the device through the cloud server command module 410. The PINApp will determine that the public cloud storage service 450 is sharing the file folder 435 and will engage the PINAPP management module 425 and the database management module 420. The PINApp management module 425 will provide addressing and routing information to the public cloud storage service 450, enabling the sharing to take place. The PINApp management module 425 will also record information provided by the public cloud storage service 450 such as contacts the file folder 435 has been shared with, and the associated access permissions. This information will be provided by the PINApp management module 425 to the database management module 420 for archive purposes. Any changes made to the access rights, sharing permissions, location of the digital content (file folder 435) or other instances that effect the shared file folder 435 will be recorded within the database management module 420.

Figure 5:
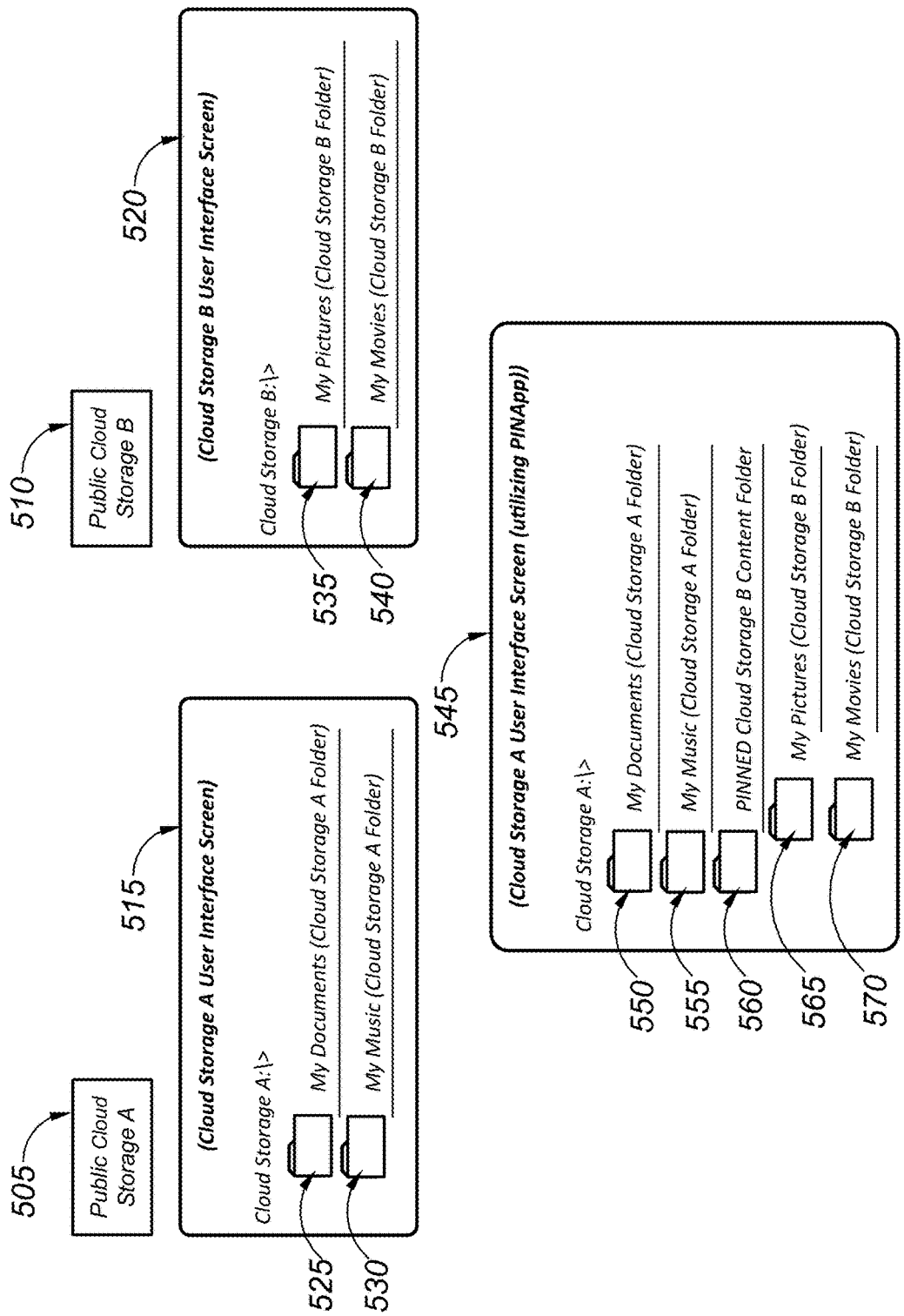
FIG. 5 is a representation of the User Interface screens merged utilizing the PINApp.

As discussed, the PINApp allows a user to digitally "pin" a locally hosted folder, file or drive to a public cloud storage service for the purpose of enabling them to share digital content stored on their local user device through the cloud, negating the need to upload or otherwise copy the digital content to a public cloud server. In addition to the above referenced functionality, the PINApp provides a method wherein the contents of a public cloud storage service (such as Dropbox) can be digitally "pinned" to another public cloud storage service (such as StoAmigo). The digital content stored in the first public cloud service (such as Dropbox) will be represented by a folder in the second service (such as StoAmigo). Utilizing the above example, a user would be able to access their StoAmigo public cloud storage account and see all of the digital content stored on their Dropbox public cloud storage account as well. The digital content contained within the Dropbox account would be represented within the StoAmigo user interface screen as a folder, existing as a moveable subdirectory of the main StoAmigo System folder. As an example, when a user accesses their StoAmigo public cloud storage account, they would see a folder entitled "Dropbox". The Dropbox folder (when accessed) would contain all of the digital content held within the Dropbox public cloud folder. The existing Dropbox directory and subdirectory names and structures would be used, and housed within the main Dropbox folder, existing as a subdirectory within the StoAmigo user interface. FIG. 5 below illustrates how the digital content would be represented within the PINApp, wherein one public cloud storage service is digitally "pinned" to another public cloud storage service.

Referring to FIG. 5, we have public cloud storage A 505 and public cloud storage B 510. A user (not pictured) utilizing the PINApp wishes to digitally associate or otherwise "pin" the contents of public cloud storage B 510 to public cloud storage A 505. This will enable the user (not pictured) to access all of their digital content from the user interface of public cloud storage A 505, negating the need for the user to switch between the two public cloud storage services to manage digital content.

As shown in FIG. 5, public cloud storage A has a user interface screen 515 that shows two folders currently being stored on public cloud storage A 505. These folders are My Documents 525 and My Music 530. The user also has a secondary public cloud server account, represented as public cloud storage B 510. Hosted on public cloud storage B 510, the user has two folders as shown in the public cloud storage B user interface screen 520. These folders are My Pictures 535 and My Movies 540. By utilizing the PINApp to digitally associate the content hosted on public cloud storage B 510 with that of public cloud storage A 505, all of the digital content stored on these public cloud storage services (A 505 and B 510) would be combined in a single user interface screen as represented in FIG. 5, 545. The updated cloud storage A user interface screen 545 shows the digital contents that exist on public cloud storage A 505 as represented by cloud storage A user interface screen 515, and the digital contents that exist on public cloud storage B 510 as represented by cloud storage B user interface screen 520. The updated cloud storage A user interface screen 545 contains (from public cloud storage A 505) My Documents 550 and My Music 555, as well as a newly created folder PINNED Cloud Storage B Content Folder 560. This folder, created by the PINApp allows the digital content stored on public cloud storage B 510 to be shown within the cloud storage A user interface screen 545. The folder names My Pictures 565 and My Movies 570 remain unchanged, and are listed exactly as represented by cloud storage B user interface screen 520.

While the digital content hosted on the servers (public cloud storage A 505 and public cloud storage B 510) does not physically move or otherwise get copied or downloaded, the file and folder names and locations will appear in the combined user interface screen (cloud storage A user interface screen 545) to enable the user to access their digital content from both of the public cloud storage systems (A 505 or B 510) without physically changing the user interface or switching between the systems.

The PINApp (as explained above) allows the contents of one or more public cloud storage services to be listed as a folder and/or subdirectory within another. Once a connection between the two public cloud storage services is established through the PINApp, the user can easily log into their "primary" public cloud storage service (in this case public cloud storage A 505) and see the digital contents of public cloud storage B 510 as they have been digitally pinned. It's important to note that the storage space in public cloud storage A 505 is not being utilized to store the digital contents currently hosted on public storage B 510, but rather the directory and subdirectory listings are being shared. The process as illustrated in FIG. 5 and the above description can be repeated, allowing a user to utilize the PINApp to digitally pin multiple cloud storage services to a single service, thus eliminating the need to switch between services for the purpose of managing their digital content.

As previously discussed, one preferred embodiment of the PINApp allows a user to pin a folder hosted on a local device to a public cloud service for the purpose of sharing the digital content contained in the folder without the need to upload it to the public cloud. Further, the PINApp negates the need for a dedicated device referred to in public retail sectors as PCD's, "Personal Clouds", "Private Clouds" and NAS devices. By eliminating the need for the dedicated device as described, and the need for the digital content to be uploaded or otherwise copied to the public cloud, a user can safely share their digital content with friends and family, without ever having the content leave their device, and minimizing the cost to do so. The functional aspects of pinning locally stored digital content to a public cloud service will now be discussed with reference to FIG. 6. While FIG. 2 discussed primarily a folder hosted on a device, FIG. 6 will focus on pinning an entire device to a public cloud service.

Figure 6:
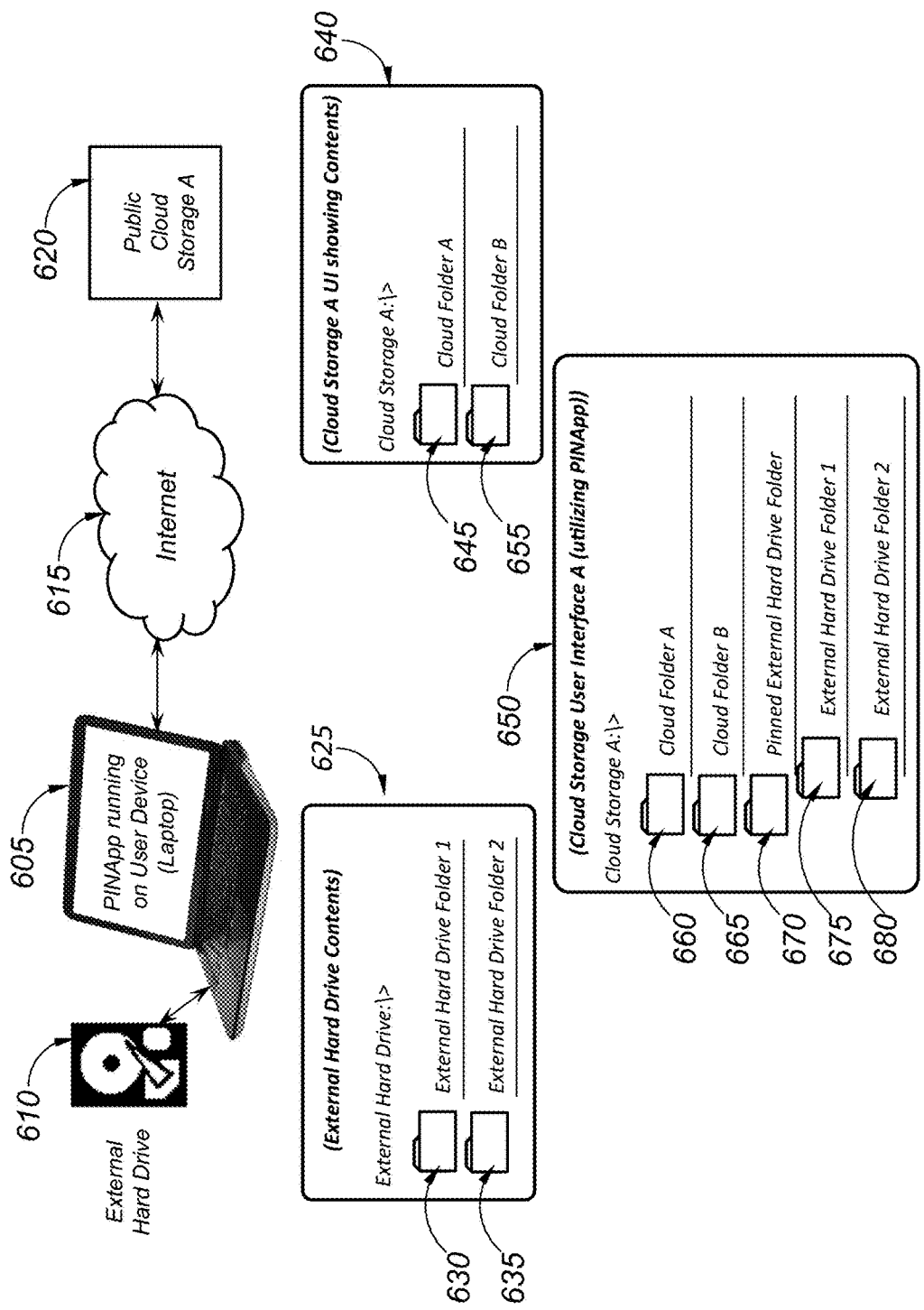
FIG. 6 is a block diagram detailing how the PINApp digitally associate (pin) an external hard drive to a public cloud storage service.

As can be seen in FIG. 6, a laptop computer 605 with an external hard drive 610 is connected to the Internet 615. The process of pinning the external hard drive 610 to the public cloud storage A 620 begins by the user launching the PINApp on the user device, in this case, a laptop computer 605. Once the PINApp is running, the user will log into the public cloud storage A 620 by entering the appropriate login credentials.

Once the connection from the laptop 605 to the public cloud storage A 620 is established the user can utilize the PINApp running on the laptop 605 to digitally associate, or "pin" the external hard drive 610 to the public cloud. The pinning process takes place within the PINApp, wherein the software shares addressing and location information relative to the digital content (i.e. files and folders) stored on the external hard drive 610. The PINApp presents this information to the public cloud storage A 620 in a format wherein the public cloud storage A 620 can easily identify the folder containing the digital content stored on the external hard drive 610 and can add the folder to the existing folder and file listing containing the digital content currently stored on the public cloud storage A 620.

The addressing and routing information provided by the PINApp running on the laptop 605 to the public cloud storage A 620, relating to the digital content stored on the external hard drive 610 allows the public cloud storage A 620 to list the contents of the external hard drive 610 as if they were actually being stored on the public cloud storage A 620, but are actually stored locally on the external hard drive 610. To illustrate, in one exemplary embodiment, addressing information may comprise an IP or other network address (and or communication port) of a laptop 605 while routing information may comprise a routing table or other data defining a path (such as through one or more firewalls or not) through which communication with the laptop 605 and access to its external hard drive 610 can occur. It is noted that addressing information may be in the form of a URL or URI in some embodiments. Addressing and/or routing information may be determined by probing one or more network connections of the laptop 605, such as with traceroute or other network utility.

While all the names of each file, file sizes and directory and folder structure will appear on the updated public cloud storage user interface A 650, the digital content stored on the external hard drive 610 is never uploaded to the public cloud storage A 620. Further, if the external hard drive 610 is disconnected from the network (e.g. unplugged from the laptop 605) the digital content stored on the external hard drive 610 will no longer be accessible from public cloud storage A 620. The directory structure, file names and other routing information will still be displayed on the public cloud storage user interface 650, but the digital content will not be accessible. In a like fashion, if the laptop 605 running the PINApp is no longer connected to the Internet 615, the digital content stored on the external hard drive 610 will not be accessible from public cloud storage A 620.

To illustrate this aspect of the operation, FIG. 6 shows the digital content that is currently stored on the external hard drive 610 in reference 625. Reference 625 is an illustration of what a directory listing would look like if the user was browsing the external hard drive 610 to access the contents of the drive. The digital content currently stored on the external hard drive 610 is identified as External Hard Drive Folder 1 630 and External Hard Drive Folder 2 635. Under normal circumstances, this digital content would only be visible to the laptop 605 that is connected directly to the external hard drive 610. Utilizing the PINApp, the routing and addressing information of the digital content 625 (External Hard Drive Folder 1 630 and External Hard Drive Folder 2 635) is provided to the public cloud storage A 620 service to allow the user to access the referenced digital content 625 directly through the public cloud storage service A 620, negating the need for the user to carry the external hard drive 610 with them.

Reference 640 is the cloud storage A user interface screen, which displays the digital content currently stored on the public cloud storage A 620. The digital content currently stored on the public cloud storage A 620 is Cloud Folder A 645 and Cloud Folder B 655. Once the PINApp running on the laptop 605 enables the public cloud storage A 620 to see the addressing and routing information for the digital content 625 (External Hard Drive Folder 1 630 and External Hard Drive Folder 2 635) stored on the external hard drive 610, the public cloud storage user interface A 650 will be updated to include both sets of digital content. Specifically, the digital content stored on the external hard drive 610 (External Hard Drive Folder 1 630 and External Hard Drive Folder 2 635) will be displayed in the same public cloud user interface screen A 650 as the digital content currently stored on the public cloud storage A 620 (Cloud Folder A 645 and Cloud Folder B 655).

Upon completion of the pinning process, the digital content stored in the public cloud storage A 620 and the external hard drive 610 will be visible through the public cloud storage user interface A 650. As can be seen in FIG. 6, reference 650, each folder shown in reference 625 (External Hard Drive Contents) and 640 (Cloud Storage A UI showing contents) are now provided. The user can now remotely access the digital contents of Cloud Folder A 660, Cloud Folder B 665, Pinned External Hard Drive Folder 670, External Hard Drive Folder 1 675 and External Hard Drive Folder 2 680. PINNED External Hard Drive Folder 670 was created by the PINApp during the pinning process to provide a host location within the directory structure of the public cloud storage A 620 to enable the contents of the external hard drive 610 to be displayed in the public cloud storage user interface A 450. As with all digital content, folders (such as 660, 665, 670, 675 and 680) can be renamed, moved and otherwise managed from the cloud storage user interface A 650, once the PINApp has pinned the digital content to the public cloud storage A 620.

Now that the digital content contained in the external hard drive 610 is digitally pinned to the public cloud storage A 620, all digital content stored in both of these locations can be accessed from the public cloud storage user interface A 650. Here again, the digital content on the external hard drive 610 is not copied, moved to, or otherwise occupying storage space on the public cloud storage A 620.

The PINApp provides digital routing and addressing information to allow one or more external services, like public cloud storage and sharing services referenced in this example to access digital content stored on a local device (such as the external hard drive 610 in the above example). The routing information that is shared with the public cloud storage facility allows the public cloud storage facility to list the digital content in a readable format (such as showing folder and file names in the user interface), allowing a user to log into their public cloud account and access the digital content stored in a personal device (like the external hard drive 610) from a remote location. Here again, this gives the user remote access to their digital content, negating the need to store it on the public cloud. Further, it also negates the need for the user to purchase online storage subscriptions, or to purchase and deploy expensive "personal cloud storage" or "personal cloud" type devices.

As previously stated, once the digital content stored on the local device is pinned or otherwise digitally available through a public cloud service, the digital content stored on the local device (in this case, external hard drive 610) can be moved, copied, renamed, downloaded, uploaded, shared, played, viewed and otherwise completely managed through the public cloud service from any remote device (such as a smartphone or tablet) that is compatible with the public cloud service. Again, as long as the PINApp is running on the local device (in this case a laptop 605) and the device containing the digital content (in this case, external hard drive 610) remains connected, the digital content (represented by reference 625) will remain available remotely by accessing the public cloud.

In a similar fashion as the example above, the PINApp can be used to digitally pin local folders and drives to FTP-type (File Transfer Protocol) servers. FTP servers are often used by businesses and other public or private organizations to manage digital content in a domain or system that is completely controlled by the business. The functional connectivity and operation of the PINApp while engaging an FTP-type server is identical to that explained with reference to FIG. 6 above.

As stated previously in this submission, the PINApp can be utilized to digitally associate the contents of one or more cloud storage services with another. Further, the PINApp can be used to manage digital content stored on user owned and managed devices such as hard drives, external USB type drives, smartphones, tablets and other computing devices. The PINApp enables a user to access all of their digital content from a single location, even when it's hosted on multiple devices in a variety of locations. The PINApp negates the need continuously navigate between devices, user interfaces, software platforms and operating systems.

The PINApp is particularly well suited for use in applications wherein a user wishes to create their own environment where all of their digital content can be accessed utilizing any of their computing or smart type devices such as a laptop computer, personal computer, tablet, smartphone and other computing type devices.

The PINApp provides addressing and routing information to interconnected devices and cloud services for the purpose of detailing the location of digital content. As an example, when a folder is pinned from a local device such as a smartphone to a public cloud storage service, the PINApp provides a connection between the public cloud storage service and the folder being pinned so that the folder can be accessed through the user interface of the public cloud storage service. Since the PINApp provides routing and addressing information in real time, changes to digital content (such as adding files, renaming folders and the like) are reported to all interconnected devices instantly. Additionally, the PINApp needs to be running on the device that established the connection from the public cloud service to the digital content being pinned in order to maintain accessibility to the digital content. Once digital content has been pinned (and the PINApp continues to run) the pinned digital content will be accessible through the public cloud service it was pinned to. Ideally, the PINApp could run from a home or office personal computer that unified all of the user's digital content. This would enable the user to access all of their digital content by accessing the public cloud service the digital content was pinned to.

The PINApp does not need to be running on a device being utilized to access previously pinned digital content. As an example, if an external hard drive (as explained with reference to FIG. 6) was pinned to a public cloud storage service using one device, the user could utilize any of their other computing devices to access the public cloud storage service and gain access to the pinned digital content as long as the PINApp was still running on the device that established the pinned connection. As previously stated, the PINApp is particularly well suited for use when it can be deployed on an always-on type device. This ensures the digital content being pinned to the public cloud storage platform(s) is always readily available from any of the computing devices the user could otherwise utilize to access the public cloud storage platform.

Figure 7:
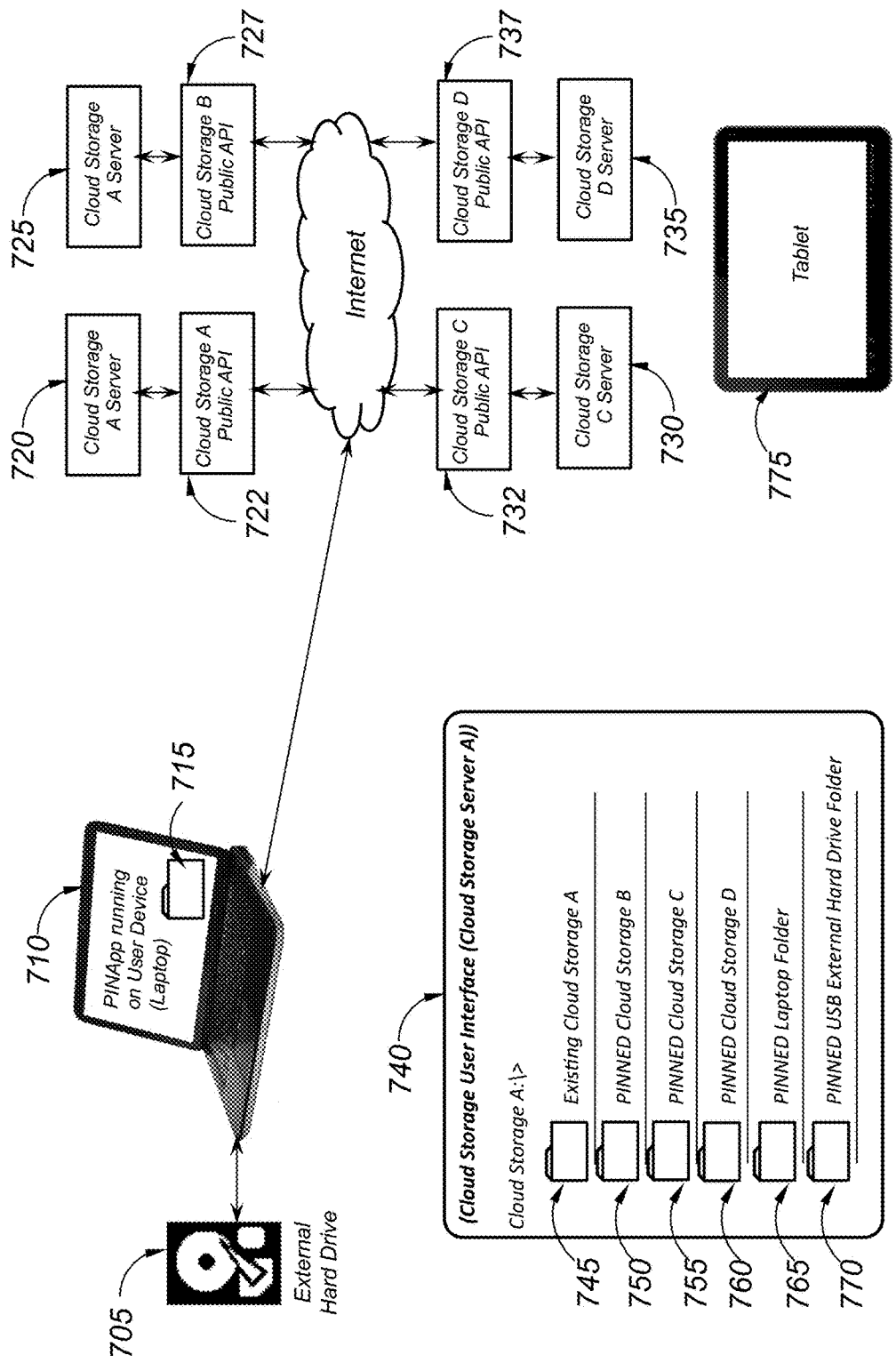
FIG. 7 is a block diagram detailing how one or more public cloud services and devices can be unified utilizing the PINApp.

The example we share in FIG. 7 will illustrate the unification of digital content stored on multiple user-owned devices and on multiple public cloud storage services. It's important to note that when unifying multiple cloud storage services as will be explained in FIG. 7, the user will need to determine which service they wish to utilize as a "primary" or "host" service. This will be the service they log into when accessing their unified digital content.

Referring to FIG. 7, the process of unifying digital content begins by a user initiating the PINApp on their computing device, in this case, a laptop computer 710. Once the PINApp is running on the laptop computer, the user must log into each of their public cloud storage accounts. It's important to note that this process only needs to happen on the initial unification or "pinning" process.

The login process takes place subsequent to the launch of the PINApp to ensure that the PINApp can establish communications with each of the cloud storage servers (cloud storage server A 720, B 725, C 730 and D 735). The PINApp will record the login information as it is entered by the user via laptop 710. Once the PINApp has the login information for each service and/or connected device, the PINApp will automatically establish and maintain connections, eliminating the need for the user to log into each service going forward.

Now that the PINApp has been launched on the local device (the laptop 710) and the user has logged into each of their respective public cloud storage accounts (cloud storage A 720, B 725, C 730 and D 735), the user can begin the process of unifying their digital content. To simplify explanation of the unification process, we will focus individually on each entity to be unified through the PINApp.

Since the user will be establishing a "primary" or "host" cloud service to allow them to share and remotely access their respective digital content being pinned through the PINApp, the user has chosen to make cloud storage server A 720 their default/primary public cloud. The PINApp will utilize cloud storage server A 720 as the default, and all digital content pinned through the PINApp will be assigned (pinned) to cloud storage server A 720.

The PINApp will now begin providing addressing, routing, file location, file permission, file type and other specifics about the digital content being pinned to cloud storage server A 720 through the cloud storage A public API 722. The information provided by the PINApp to the cloud storage A public API 722 will enable cloud storage server A 720 to include the digital content information as part of the directory structure illustrated by the cloud storage user interface 740. Each time digital content is pinned to the cloud storage server A 720, the information provided by the PINApp (hosted on the laptop 710) will be utilized to enable the cloud storage server A 720 to instantly identify digital content, location information, name and type of digital content, and other associated identifying characteristics of the digital content being pinned. Again, this information is used by cloud storage server A 720 to enable the user to access pinned digital content through the user interface of cloud storage server A 720, represented by reference 740 Cloud Storage User Interface.

Once digital content has been pinned to a server (in this case, cloud storage server A 720), the digital content can be accessed from any of the user's computing devices (laptop, tablet, personal computer, etc.) by simply logging into the cloud storage server A 720 as they normally would, utilizing their username and password associated with the cloud storage account.

Now that cloud storage server A 720 has been connected directly with the PINApp running on laptop 710, the pinning of additional content to cloud storage server A 720 can begin. As with the example above, the user running the PINApp on laptop 710 will provide detailed information to the host server (cloud storage server A 720) containing file and folder addressing, permission, access and other information about the digital content stored on the secondary cloud storage services (cloud storage server B 725, cloud storage server C 730, and cloud storage server D 735). Once all of the subsequent server information as listed above has been shared between the PINApp on the laptop 710 and the host cloud storage server A 720, the pinning process for the cloud storage services (listed above) is completed. At this point, if the user were to log into cloud storage server A 720 utilizing any of their computing devices (such as a tablet 775), the cloud storage user interface 740 representing the contents of cloud storage server A 720 would list cloud storage (server) B 750 contents as a folder, cloud storage (server) C 755 contents as a folder and cloud storage (server) D 760 contents as a folder in addition to the existing cloud storage (server) A 745 contents as a folder. Each of the above referenced folders would be shown in the cloud storage user interface 740 (representing the contents of cloud storage server A 720) and would be listed as folders of the main directory cloud storage (Cloud Storage A:/> as listed in reference 740). Since cloud storage server A 720 is serving as the host in the above unification example, all subsequent storage locations (including laptops, personal computers, folders, directories, external hard drives, USB sticks and other storage devices and/or locations) will be listed as (and shown in the user interface as) folders contained within the host. In the above example (referencing cloud storage user interface 740), each of the pinned cloud services (cloud storage B 750, cloud storage C 755 and cloud storage D 760) appear as folders within the host or primary (Cloud Storage A:/> as listed in reference 740) directory.

It's also important to note in the above example of pinning multiple cloud storage services to a single host service that none of the digital content stored on any of the servers (cloud storage server B 725, C 730 or D 735) has been transmitted to, copied to or otherwise moved to the host cloud storage server (A 720). All of the digital content will remain on their respective servers and in their respective locations. The PINApp unified the contents by providing specific detailed location, addressing, routing and other information about the digital contents of each cloud server, to the host cloud storage server (A 720). This information allows the host cloud storage server (A 720) to access and list the contents of each of the storage locations (cloud storage server B 725, C 730 or D 735) as if they were actually hosted on cloud storage server A 720. As stated above, the cloud storage user interface 740 (as accessed and viewed from tablet 775 as an example) would show the contents of all cloud storage servers (A 720, B 725, C 730 and D 735) on a single user interface. The remaining information (pinned laptop folder 765 and pinned USB external hard drive folder 770) will be explained below.

Now that all of the public cloud servers listed above have been unified under cloud server A 720, we can now unify the remaining devices. The laptop 710 has a user folder 715 that the user also wishes to pin to cloud server A 720. As stated previously, once a folder, drive or server is pinned, it will be available for access from the primary server user interface. In this example, we've utilized cloud storage server A 720 as our primary.

The user indicates through the PINApp running on laptop 710 that they wish to pin folder 715 to the host cloud storage server (A 720). The PINApp engages the cloud storage A public API 722 and provides detailed information pertaining to folder 715 (residing on laptop 710), including folder name, type, addressing, file and content information and other necessary information to allow the host cloud storage server (A 720) to access the folder 715. Once the folder 715 details have been shared with the host cloud storage server (A 720), the folder will appear when the user accesses the cloud storage server A 720 user interface. Reference 740 is a representation of the user interface for cloud storage server A 720. As can be seen in reference 740, pinned laptop folder 765 (a representation of the actual laptop folder 715 hosted on the laptop 710) is shown in the directory listing of the user interface (740). As items are added to, or removed from the interconnected devices in this example, the user interface 740 will update to reflect those changes. This includes renaming of files, folders and other activities which would cause the original contents hosted on their respective devices to change.

Finally (referring to FIG. 7), we have an external hard drive 705 connected to the laptop 710. As with the other devices, the user wishes to pin the external hard drive 705 to the host cloud storage server (A 720). As the user notifies the PINApp hosted on the laptop 710 to pin the external hard drive 705 to the cloud storage server A 720, the PINApp once again initiates a connection and opens communication with the cloud storage A public API 722. The PINApp again shares detailed information pertaining to the digital contents stored on the external hard drive 705. This includes (but is not limited to) folder & file names, types, digital location, access and addressing information and other detailed information that enables the digital content stored on the external hard drive 705 to be accessed from the cloud storage server A 720 user interface screen (as depicted by reference 740 cloud storage user interface). As can be seen in reference 740 cloud storage user interface (listing the contents of cloud storage server A 720), the pinned USB external hard drive folder 770 represents the digital contents of the physical external hard drive 705.

As with other drives and storage locations referenced in FIG. 7 (above), the pinned USB external hard drive folder 770 shown in the cloud storage user interface 740 is listed as a folder within the primary storage directory, (Cloud Storage A:/> as listed in reference 740). Here again, the screen user interface (depicted by reference 740 cloud storage user interface) can be accessed with any device that the user typically utilizes to access cloud storage server A 720. These devices (including the tablet 775 shown in the reference) do not need to be running the PINApp. Once the digital content is pinned, the digital content will be accessible from the user interface screen of the host cloud storage server (in this case cloud storage server A 720) that the digital content was pinned to.

Should the laptop 710 be turned off, disabled, or otherwise become disconnected from the network, all items that were pinned from the laptop 710 will become inaccessible until the PINApp is once again initiated and is connected to the Internet. The directories, folders and other listings created by the PINApp (as shown in 740 cloud storage user interface) will remain, but they will be inaccessible until the PINApp is restored. This is done to protect the digital content pinned while using the PINApp.

It's important to note that the above examples and references utilized in FIG. 7 (above) assumed that entire cloud services and entire drives (as with external hard drive 705) were being pinned to a host location. The user, at their discretion, can choose to pin a single folder or single directory to any of their public cloud storage services. The process would be the same as depicted above.

Unifying the digital content stored on multiple devices and cloud storage platforms allows easy access to digital content from any device that is capable of engaging the cloud platform the digital content is pinned to.

The ARC (Asynchronously Rendered Conduit) technology is designed to manage the access and flow of digital content within the PINApp system, or other managed digital content storage and access systems. While the details that follow discuss the ARC technology as a functional component of the PINApp system, the ARC itself is a stand-alone architecture and may be deployed as a component of another digital content management system, or may be deployed as a supplemental application to support other like systems.

Working within the PINApp system, the ARC provides users an easy and effective way to manage digital content that is being accessed, transferred and/or otherwise moved between connected devices. The ARC may also be utilized in applications where digital content controlled within the PINApp system must be accessed by a recipient or other non-owner party that exists outside the controlled environment of the PINApp system.

The ARC system enables the creation of a digital access profile that is created by the digital content owner to govern the usage of digital content managed and/or protected by the ARC. The ARC works by taking the access and usage input provided by the digital content owner or system administrator, and creating a digital access profile that can be accessed by one or more recipients (non-owners/administrators) to govern how the subject digital content is utilized, accessed, stored, managed, forwarded and/or engaged by the recipient party(s).

The ARC profile contains all elements of the digital content being managed in addition to all the control parameters designated by the digital content owner. The ARC takes these elements and creates a single, easily transported digital content format (or profile) to carry the host content and control information across devices, networks, domains, and between one or more parties. The ARC also contains encryption, expiration, display, and messaging information required to enable both PINApp and non-PINApp recipients to access subject digital content.

Based on the parameters set by the content owner or administrator, the ARC may allow digital content to be passed between devices, networks, and domains, or may require the recipient to access the digital content directly from the host location within the host system (such as PINApp). In one preferred embodiment, the ARC may be utilized to enable a recipient to take control and/or receive a digital copy of the owner(s) original content for the purpose of storing a back-up or creating a "spare". In another embodiment, the digital content may require enhanced security restrictions, wherein the recipient may not take ownership of the digital content, but rather be able to view the content in the host location that the content owner has selected. By allowing the digital content owner to maintain control of content that is accessed by other parties, the ARC aligns with regulations and controls such as HIPAA and other regulations that govern the management of very personal and private digital content such as patient records, legal documents, and the like.

The ARC governs all aspects of both access and usage for any digital content within the host PINApp (or other subject) management system. The ARC is intended to provide complete control over digital content across multiple networks, realms, and devices simultaneously, while allowing the content owner to pass (or allow access to) digital content to one or more recipients or groups of recipients without limit, and maintaining the integrity of the digital content across transactions.

The ARC also provides the capability of enabling third party engagement with digital content that may be used in wholesale or retail-type sales transactions. In one preferred embodiment, the ARC profile may be configured to contain payment service processing information to allow the digital content owner to accept a digital payment, negating the need for the recipient to navigate to a third party site and input their payment parameters before returning to the primary digital content hosting location. In another preferred embodiment, the payment method required to access the digital content may take place directly within the ARC through a bank transfer or other electronically controlled financial transaction. Unlike existing pay walls and financial transactions, the ARC can be transported to a recipient negating the need for a recipient to navigate to a paywall, shopping cart or other digital payment processing service.

ARC speeds up the process of accepting payment for digital content and/or services by eliminating the need for the recipient to navigate to a third party site, then back to the subject digital content.

In another preferred embodiment, the ARC profile may be configured to allow a professional such as a doctor to share private and personal information with an insurance carrier for the purpose of billing, while preventing the carrier from taking control and/or ownership of the private documentation. Further, the ARC informs the digital content owner (such as the doctor) when the recipient (such as the insurance company) has accessed the digital content provided through the ARC. This same ARC profile may be accessible by the patient of the subject doctor, allowing the patient (as an example) more access and rights to the digital content (patient data) than was afforded the insurance carrier.

The primary components of the ARC system will now be discussed with reference to FIG. 8. It is important to note that while these discussions reference the ARC as a component of the PINApp system, the ARC may be deployed in any public or private networking configuration where digital content is stored, accessed and/or managed. The following discussion (with reference to FIG. 8) will explain the component modules of the ARC and their intended usage(s). A functional description of the creation and utilization of the ARC will be provided later in this submission. Please also note that each ARC component discussed with reference to FIG. 8 may be enabled or disabled at any time by the digital content owner managing the creation of the ARC.

For the purpose of easing the explanation of the component modules within the ARC, only primary functionality will be disclosed. It will be apparent to one skilled in the art that multiple secondary functions likely exist within each ARC functional module.

Figure 8:
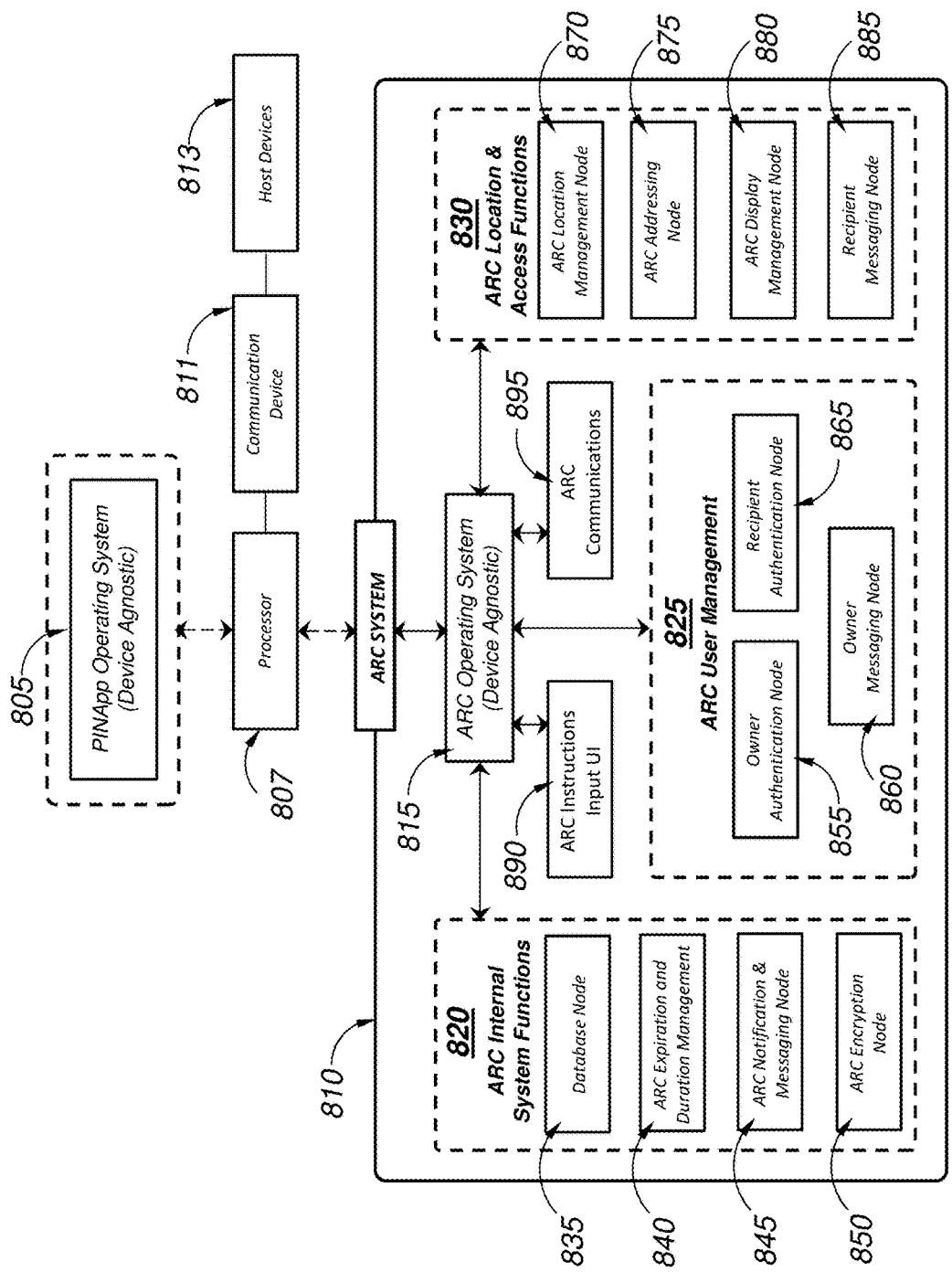
FIG. 8 is a block diagram showing the functional system modules of the ARC system.

With reference to FIG. 8, the ARC system 810 is connected to the PINApp operating system 805 through a processor 807. The processor 807 is connected to a communication device 811 and the subsequent host devices 813 within the PINApp system. These components (PINApp operating system 805, processor 807, communication device 811, host devices 813 and the ARC system 810) do not need to be collocated, and can exist anywhere on a LAN/WAN or other wide area network wherein all devices are connected via the internet or other broad spectrum communications mechanism.

The ARC system 810 is powered by an ARC operating system 815. This device-agnostic operating system is designed to work in conjunction with the primary host system (the PINApp operating system 805 via the processor 807) to manage and control all aspects of the creation and management of the ARC profiles. The ARC system 810 (in addition to the operating system 815) has three basic groups of functional subsystems. These are the ARC internal system functions 820, the ARC user management 825 and the ARC location and access functions 830 subsystems. Integrated into these subsystems as input/output components of the ARC system 810 are the ARC instructions input user interface 890 and the ARC communications 895 modules. The ARC instructions input user interface 890 controls all of the user input that governs the creation of the ARC profile and works in conjunction with each system module to ensure the appropriate criteria is provisioned within the ARC profile. The ARC communications module 895 is responsible for all communications internal to the ARC system 810, such as error messages, direct module command communication, and the like. The ARC communications module 895 also controls all communications with the host system (PINApp operating system 805 or other host system) to ensure the systems are properly integrated and working in sync.

It is important to note that each module within the aforementioned subsystems are controlled by the digital content owner or host creating the ARC profile, and can be enabled/disabled or provisioned at any time before, during, and after such a time as the ARC profile has been created. This also applies to ARC profiles that have been accessed and/or engaged by one or more recipient parties. Further, the ARC system 810 allows the owner or administrator to individually control access to the digital content managed within the ARC system 810, even if it is accessed by and/or transferred to multiple parties at the same time. As an example, the ARC system 810 may be modified before, during, or after being sent to two recipients, where the ARC system 810 access rights of recipient number one are revoked or otherwise altered in some manner, while the access rights of recipient number two remain unchanged.

The ARC internal system functions subsystem 820 is responsible for controlling system functions including (but not limited to) database node 835, ARC expiration and duration management 840, ARC notification and messaging node 845 and the ARC encryption node 850.

The database node 835 collects and reports (to the PINApp operating system 805 or host system) all of the associated parameters, addressing, security, access settings, and other specific details of the ARC profile being created to manage a specific piece of digital content. As an example, the database node 835 will collect, store, and report (to the PINApp operating system 805 or other system database) detailed information about the digital content being accessed or managed by the ARC system 810, such as whom may access the digital content being managed, how that content may be used, if that content may be forwarded or otherwise downloaded, the physical address of the recipient of the digital content, any expiration information associated with this usage, and the like. The database node 835 will collect, store, and report this information for each piece of digital content managed through the ARC system 810, including all completed ARC profiles for all digital content managed with the ARC system 810.

The ARC expiration and duration management 840 is provided to control the availability (time span) of the digital content being controlled, the amount of time the digital content remains available once accessed, and the number of times the subject digital content may be used. The ARC expiration and duration management 840 will provision the ARC system 810 to the appropriate "time to live" for the digital content, allowing the owner/administrator to manage the expiration of the digital content, should an expiration be required. In addition to an expiration date and time, the ARC expiration and duration management 840 may be provisioned to determine the amount of time digital content remains active once accessed. As an example, if a recipient accesses digital content such as a test that has been distributed by a college or other learning institution, the expiration and duration management module could control the duration of time (in hours/minutes) that the test remains active for the recipient/viewer once the subject test has been accessed. The ARC expiration and duration management 840 also governs the number of times digital content may be accessed. In one preferred embodiment, digital content such as a movie or video may be managed within the ARC profile. The host or owner of the digital content (such as the subject movie) may provision the ARC profile to restrict the access to that movie to a single use. This will cause the movie to be inaccessible to the recipient (non-owner/host) after the single use has been exhausted.

The ARC notification and messaging node 845 controls functions such as notifying the owner of the digital content being managed within the ARC system 810 when the content is accessed by a recipient. The ARC notification and messaging node 845 works in conjunction with the ARC operating system 815 and the database node 835 to capture, record, and report all access and usage information for digital content managed within the ARC system 810, and the subject ARC profile. As an example, the ARC notification and messaging node 845 will report (to the database node 835, the PINApp operating system 805 and the digital content owner) each individual instance wherein digital content is accessed by the recipient of the ARC profile managing the subject digital content. Each execution or action taken against the digital content will be captured and recorded, providing a record of all actions taken against the digital content. In addition to notification messages from the ARC system 810, the ARC notification and messaging node 845 will also carry message information generated by the digital content owner and creator of the ARC profile for the purpose of communicating to the one or more recipients of the digital content controlled by the ARC system 810. As an example, the owner of the digital content may enclose a personal message to one or more of the recipients of the digital content such as "here is the file you requested". This message may be specified to individual recipients of the ARC profile, or to the group of recipients as a whole. There is no limitation on the size of the message contained within the ARC profile, or the number of recipients who may receive and/or access the message.

The ARC encryption node 850 provides the capability of encrypting the ARC profile to enhance the protection of the digital content being managed within the ARC system 810. The encryption can be generated from any of a number of third party encryption mechanisms as well as being provided by the PINApp operating system 805 or other host systems. The ARC encryption node 850 allows for a variety of encryption methodologies including 2-factor authentication, proprietary encryption, and military 256-bit encryption among other encryption methodologies. The ARC encryption node 850 is designed to be inclusive of all types of encryption, regardless of coding or algorithm. Encryption for digital content being managed within the ARC profile may be applied to the ARC system 810 at any time during the lifecycle of the ARC profile, including before, during, and after a recipient has been given access to digital content being managed within the ARC profile. This allows the digital content owner to apply additional protections for their content even after it has been accessed by, or otherwise transferred to, one or more recipients.

The ARC user management subsystem 825 provides management for functions within the ARC system 810 such as the owner authentication node 855, the owner messaging node 860, and the recipient authentication node 865. The ARC user management subsystem 825 provides identity protection and verification mechanisms to ensure both the security and integrity of the ARC system 810. Working in conjunction with the PINApp operating system 805 or other host system, the nodes contained in the ARC user management subsystem 825 control access to the digital content managed within the ARC system 810 and subsequent ARC profiles.

With continued reference to FIG. 8, the owner authentication node 855 is responsible for verifying the identity of the digital content owner, seeking to utilize the ARC system 810 to manage and protect digital content that is hosted within the PINApp operating system 805 (or other) system. The owner authentication node 855 works in conjunction with the ARC operating system 815 and subsequently the PINApp operating system 805 (or other host system) to verify that the owner seeking access to the ARC is the same owner who is already logged into and working within the PINApp operating system 805 or other host system. Should these two systems (the PINApp operating system 805 and the ARC system's 810 owner authentication node 855) show different results for the user currently logged into the host (PINApp operating system 805) system, the owner authentication node 855 will deny authentication of the owner. It is important to note that regardless of the host system (in this case PINApp operating system 805) the owner authentication node 855 will reject attempts to log into the ARC system 810 that do not exactly match the identification and authentication of the host system (PINApp operating system 805).

The recipient authentication node 865 provides a similar function to the previously referenced owner authentication node 855. The recipient authentication node 865 works in conjunction with the PINApp operating system 805 to validate the designated recipient of digital content that is managed by the ARC system 810 and the subsequent ARC profile. As an example, a digital content owner wishes to allow a recipient to access a file managed by the ARC system 810 that resides in the PINApp operating system 805. The PINApp operating system 805 (or other host operating system) will create a record of the recipient identification information for the subject access request, and store this information within the database of the PINApp operating system 805. In a like-fashion the recipient authentication node 865 will verify that the recipient designated within the host operating system (in this example, the PINApp operating system 805) is identical to the recipient designated through the ARC recipient authentication node 865. As stated previously, a detailed functional interaction of each module during the creation of an ARC profile will be discussed later in this submission.

With continued reference to FIG. 8, the third operational subsystem of the ARC system 810 is the ARC location and access functions 830. The ARC location and access functions 830 supports the ARC system 810 functions such as the ARC location management node 870, the ARC addressing node 875, the ARC display management node 880 and the recipient messaging node 885. All functional nodes hosted within the ARC location and access functions subsystem 830 are responsible predominantly for functional aspects of the ARC system 810 relating to digital content being managed after recipient access to the content has been granted by the digital content owner.

The ARC location management node 870 is responsible for tracking the location of the digital content being managed through the ARC profile within the host PINApp operating system 805. As an example, if a file is moved from one connected host device 813 to another connected host device 813 within the host system (in this case PINApp operating system 805), the ARC location management node 870 will notify the database node 835 that the subject digital content has been moved. All ARC profile data associated with the subject digital content will be updated in the database node 835 to ensure proper functionality of each ARC profile within the ARC system 810. Working in conjunction with the ARC addressing node 875, the ARC location management node 870 directs the ARC profile being accessed by a recipient to the correct digital content being managed within the host (PINApp operating system 805) system. As an example, an ARC may be protecting and managing digital content that has been accessed by, or otherwise transferred to, a specific recipient. When the recipient accesses the subject ARC profile, the ARC location management node 870 will direct the recipient directly to the subject digital content (being hosted on host devices 813), while restricting access to any other content hosted within the host devices 813.

The ARC addressing node 875 manages the recipient information for the ARC profile being accessed by, or otherwise transferred to, one or more recipients. The recipient addressing information used by ARC system 810 may include (but is not limited to) an email address, a smartphone number (telephone number), an employee or other managed identification number, a social security number, a physical street address, a multi-factor authentication provided through the host operating system (in this example, the PINApp operating system 805), any combination of the previous mechanisms, or other identifier as provided and available within the host system (PINApp operating system 805). When multiple identifiers for a specific recipient are available, all will be used to ensure positive identification of the recipient wishing to access the digital content managed and protected by the ARC system 810. In cases where multiple identifiers are utilized, all must match or access will be denied. It is important to note that while the ARC system 810 does provide its own encryption methodologies, it works in conjunction with other system encryption mechanisms to add multiple layers of protection to digital content protected through the ARC system 810.

As referenced above, the ARC addressing node 875 provides the physical address of the location in which digital content managed through the ARC system 810 will reside or otherwise be transferred to. The ARC addressing node 875 collects information about the digital content as provided by the digital content owner. As an example, the owner may store digital content (such as a file) in a hard drive on their personal computer. The ARC addressing node 875 will retain that information, working in conjunction with the database node 835 in order to ensure that the content is hosted in a location suitable to the owner. If the referenced digital content is to be viewed/accessed/transferred to a recipient or group of recipients, the ARC addressing node 875 will also host (along with the database node 835) the appropriate address information for the referenced recipient (s). The recipient(s) address information will be cross-checked against the recipient(s) address hosted within the host PINApp operating system 805 or other host system as appropriate.

Continuing to reference FIG. 8, the ARC display management node 880 provides visual display rendering information for the digital content being managed through the ARC system 810. As an example, the ARC system 810 may be transferring a video file to a recipient or group of recipients. The ARC display management node 880 would provide the recipient device(s) the information required to properly display the content provided, while also taking into consideration the relevant specifications of the recipient device. In one functional example, a recipient may be utilizing a portable device such as a smartphone or tablet to view the digital content being managed and transferred via the ARC system 810, while in another; the recipient may be using an HD-TV to view the digital content. The ARC display management node 880 works in conjunction with the host system (PINApp operating system 805) as well as the remote host devices 813 that will be receiving or hosting the digital content to support a native viewing experience. The ARC display management node 880 also works directly with all web browsers and other online management hosts to ensure proper viewing on all devices.

The recipient messaging node 885 allows the recipient of digital content transferred or otherwise made available through the ARC profile to send messages directly to the digital content owner. As an example, the recipient of digital content within an ARC profile may simply send a "thank you" note to the digital content owner who transferred the digital content to the recipient. There is no set limit as to the number or size of messages that can be communicated through the ARC profile while the subject ARC profile is active.

The ARC instructions input user interface 890 hosts all of the control mechanisms and settings that can be engaged during the creation and management of an ARC profile. The ARC instructions input user interface 890 will be discussed in detail later in this submission.

The ARC communications node 895 is responsible for all communications between the ARC system 810, digital content owners, and recipients. The ARC communications node 895 manages the creation and tracking of messages, and works in conjunction with the database node 835 to store all associated communications related to each ARC profile created. This is for the protection of the digital content owner, and a higher level of management of the digital content being supported by the ARC system 810.

The ARC modules discussed above compose the primary functional elements required to create an ARC profile for the purpose of managing digital content within a digital realm. For the purpose of clarity of this submission, lesser and more commonly known functional elements have been purposefully omitted.

The creation of the ARC profile is based primarily on input received through the ARC system 810 from the digital content owner. The digital content owner can select a variety of parameters they wish to apply to the ARC profile, governing the usage of the subject digital content. These selections include, but are not limited to, access rights that determine if the recipient may download and take ownership of the digital content; forwarding rights that govern the recipients' ability to send the digital content to other recipients; expiration date and time rights that govern how long the digital content may be active within the ARC profile; and other usage and permission-type restrictions and/or limitations.

Provisioning of the functional modules referenced above and contained within the ARC system will now be discussed with reference to FIG. 9. Please note that the provisioning screens and elements associated are intended to provide details on the unique functionality of the ARC system. As such, some of the more generally known provisioning elements are not discussed.

Figure 9:
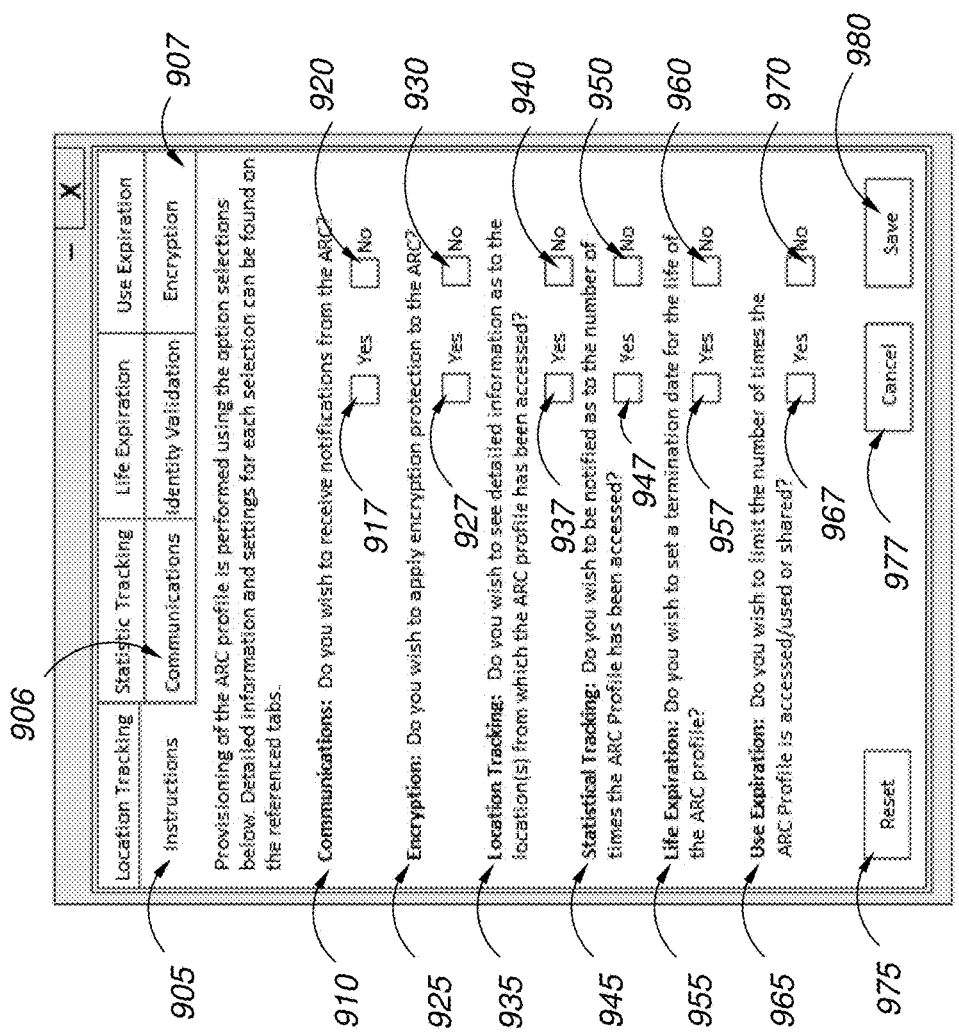
FIG. 9 is an illustration showing the instructions user interface screen as provided within the ARC.

As can be seen in FIG. 9, the ARC provides an instructions input user interface 905. The primary function of the instructions 905 user interface screen is to allow a digital content owner to enable and/or disable the functions they wish to apply to the ARC profile. Once a function is enabled, such as the communications 910 function, the secondary aspects of the enabled module (in this case, the communications 910 function) can be accessed and managed through its associated user interface screen (in this case, communications 906). The instructions 905 user interface screen works in conjunction with the remainder of the settings screens to allow a digital content owner to easily view the state in which the majority of programmable options for the ARC profile are set.

As can be seen on the instructions 905 user interface screen, the user can control the communications 910 function. The communications 910 function (based on provisioning on the communications tab 906) may provide an SMS, text, or email message to the digital content owner to communicate statistical information about the ARC profile such as usage/access attempts, IP addresses reporting, and other statistical and geolocation data, depending on the settings as provisioned by the digital content owner. The communications 910 function may be set to send messages by selecting "yes" 917, or may be disabled by selecting "no" 920. If the digital content owner has set the communications 910 function to yes 917, the digital content owner may utilize additional settings and options that are available on the communications 906 user interface screen, discussed later in this submission. Any setting on the instructions 905 user interface screen that is left blank (i e the user selects neither "yes" nor "no" during provisioning) will result in a "no" or a "disable" of the associated feature.

The instructions 905 user interface screen also allows a digital content owner to enable or disable the encryption 925 function. The encryption 925 function may be enabled by selecting yes 927, or disabled by selecting no 930. As with all functional settings available on the instructions 905 user interface screen, the encryption 925 setting works in conjunction with the associated encryption user interface screen 907 that will be discussed later in this submission.

The instructions 905 user interface screen provides the digital content owner with the ability to enable or disable location tracking 935. By setting the location tracking to yes 937, the location tracking 935 function will be activated, allowing the ARC to collect geolocation data pertaining to the recipient accessing the ARC profile. Setting the location tracking 935 function to no 940 will disable location tracking 935. The location tracking 935 function works in conjunction with the location tracking user interface screen (discussed later in this submission) that provides detailed provisioning information and further control over the location tracking 935 function. Details of the location tracking 935 function will be discussed later in this submission.

The instructions 905 user interface screen provides access to the statistical tracking 945 setting. The digital content owner can enable the statistical tracking 945 setting by selecting yes 947, or disable the setting by selecting no 950. The statistical tracking 945 setting works in conjunction with the statistic tracking user interface screen (discussed later in this submission) that provides detailed settings and provisioning options to enable the collection of statistics such as access attempts, failed access attempts, and other statistical and functional engagements that have been executed against the ARC profile. Details of the statistical tracking 945 setting will be discussed later in this submission.

The instructions 905 user interface screen provides the digital content owner with access to the life expiration 955 settings. Selecting yes 957 will enable the life expiration 955 setting, while selecting no 960 will disable the life expiration 955 setting. Once enabled, the life expiration 955 setting will work in conjunction with the life expiration user interface screen (discussed later in this submission) to provide detailed provisioning options to govern the life expiration of the digital content being managed by the ARC profile. Details of the life expiration 955 settings will be discussed later in this submission.

The instructions 905 user interface screen allows the digital content owner to set the use expiration 965 function, governing the number of uses that the ARC profile will be available for access by the one or more recipients. The digital content owner can set the use expiration 965 function to yes 967 which will enable the use expiration 965 function, or to no 970 which will disable the function. Once the use expiration function 965 is set to yes 967 (enable), the digital content owner gains access to detailed settings for the use expiration 965 function, provided on the use expiration user interface screen. Details of the use expiration 965 function will be discussed later in this submission.

The instructions 905 user interface screen also provides the digital content owner with the option to reset 975 all of their previously chosen options, or to save 980 or cancel 977 the changes/settings made to the instructions 905 user interface screen during the current session. By selecting cancel 977, the digital content owner will back out of the instructions 905 user interface screen and return to a previous menu (not pictured). None of the provisioning changes or settings applied during the session will be saved. If the digital content owner selects save 980, all changes to settings made during the session will be saved. If the digital content owner selects reset 975, all provisioning settings and options will be disabled, removing any of previously selected options or settings.

As stated previously, the instructions 905 user interface screen provides the digital content owner with a simple view of the current provisioning options selected for the ARC profile. Any functional aspect that is set to yes or enable can be managed in detail through the secondary user interface screen under the respective command set. As an example, the communications 910 function (other than yes 917 and no 920) are managed and controlled through the communications 906 user interface screen.

The functional settings for the communications function will now be discussed with reference to FIG. 10. It's important to note that the settings and provisions available in FIG. 10 require that the communications 910 function (as shown in FIG. 9) is enabled 917 through the instructions 905 user interface screen as discussed with reference to FIG. 9 above.

Figure 10:
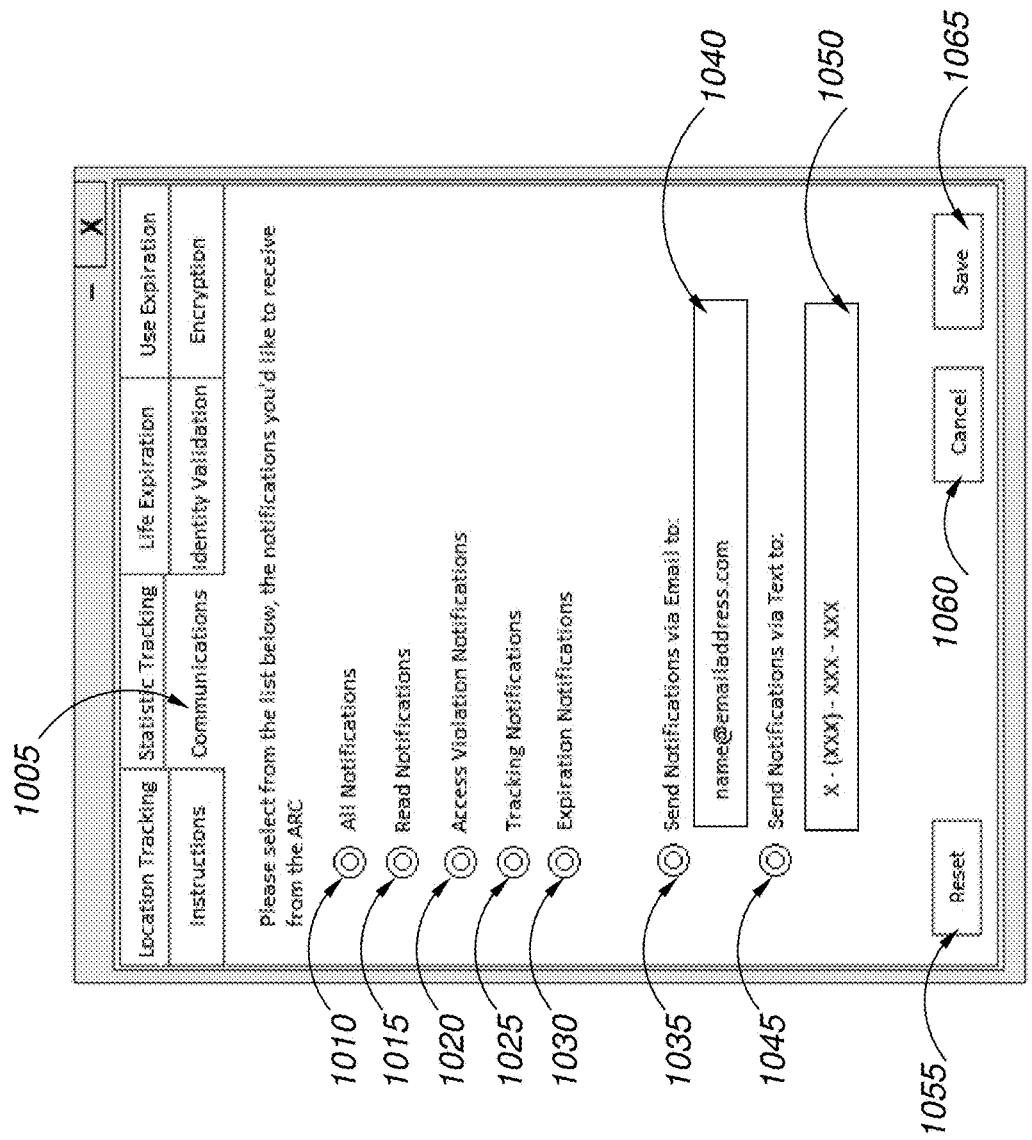
FIG. 10 is an illustration showing the communications user interface screen as provided within the ARC.

As can be seen in FIG. 10, the communications 1005 user interface screen gives the digital content owner access to all of the settings that govern the communications that can be sent from the ARC to the digital content owner. The digital content owner is given the choice of which notifications they would like to receive, and how they would like to receive these notifications. Selecting all notifications 1010 will provide the digital content owner with notifications pertaining to all aspects of any collected and reportable data that has come into contact with the ARC profile. This includes (but is not limited to) access violations, IP addresses, read notifications, and other data that may be collected by the ARC and/or the host (PINApp) system.

Selecting read notifications 1015 will provide the digital content owner with a notification each time the ARC profile is accessed by an authorized user. Selecting access violation notifications 1020 will provide the digital content owner with a count of each unauthorized attempt (if any) that was made to access the ARC profile. An unauthorized attempt may be defined by any access attempt that provided inaccurate identity validation information, inaccurate username, password, PIN, passphrase, or any other attempt to access the ARC profile and its associated digital content that fall outside of an accurate and verifiable user access attempt.

Selecting tracking notifications 1025 will enable the ARC to submit both statistical tracking and location tracking information pertaining to the subject ARC profile. Statistical tracking information reported may include (but is not limited to) the number of times the digital content managed by the ARC profile has been accessed, played, viewed, or otherwise read. Location tracking information reported may include (but is not limited to) geolocation data such as an IP address of where the ARC profile is currently being accessed from. This data may additionally include device type, operating system, country, region, and the like.

Selecting expiration notifications 1030 may provide the digital content owner with notifications pertaining to the expiration time/date of the digital content being managed by the ARC profile, or may provide use expiration information, should the ARC profile be approaching its use expiration count. Once the digital content owner has selected the appropriate notifications they wish to receive, they may then select how they wish to receive the selected notifications. The digital content owner may opt to receive email notifications by selecting the appropriate option 1035, and entering an email address 1040 into the appropriate field. Should the digital content owner wish to receive the notification email at multiple email addresses, they may be entered into the appropriate field 1040 and separated by a comma (,). The digital content owner may also require a text message be sent with the selected notification information. The digital content owner can select a text message by selecting the appropriate option 1045. The number(s) where the text message(s) should be sent can be entered into the appropriate field 1050. Multiple numbers entered into the field 1050 should be separated by a comma (,). It is important to note that the ARC supports additional notification methodologies. The example above was limited to email and text only to provide a general idea of the functionality of the notification system within the ARC.

The digital content owner may choose to abandon all settings on the communications 1005 user interface screen by selecting cancel 1060. Once cancel 1060 has been selected, the user will be returned to the previous (instructions user interface screen as detailed in FIG. 9) screen. Selecting cancel 1060 will abandon any settings and/or changes made during the current session. The digital content owner may choose to save 1065 the settings made during the current session. Selecting save 1065 will save all currently selected settings and options, and close the communications 1005 user interface screen, returning the digital content owner to the previous (instructions user interface screen as detailed in FIG. 9) screen. The digital content owner may also choose to reset 1055 all settings on the communications 1005 user interface screen. Selecting reset 1055 will remove any and all provisioning options on the communications 1005 user interface screen (including email address 1040 and text notification 1050 information), effectively disabling all settings.

The identity validation user interface screen will now be discussed with reference to FIG. 11. It's important to note that while other identity validation information may be entered into the identity validation 1105 user interface screen, FIG. 11 is limited to ease explanation of the primary functions of the identity validation feature within the ARC.

Figure 11:
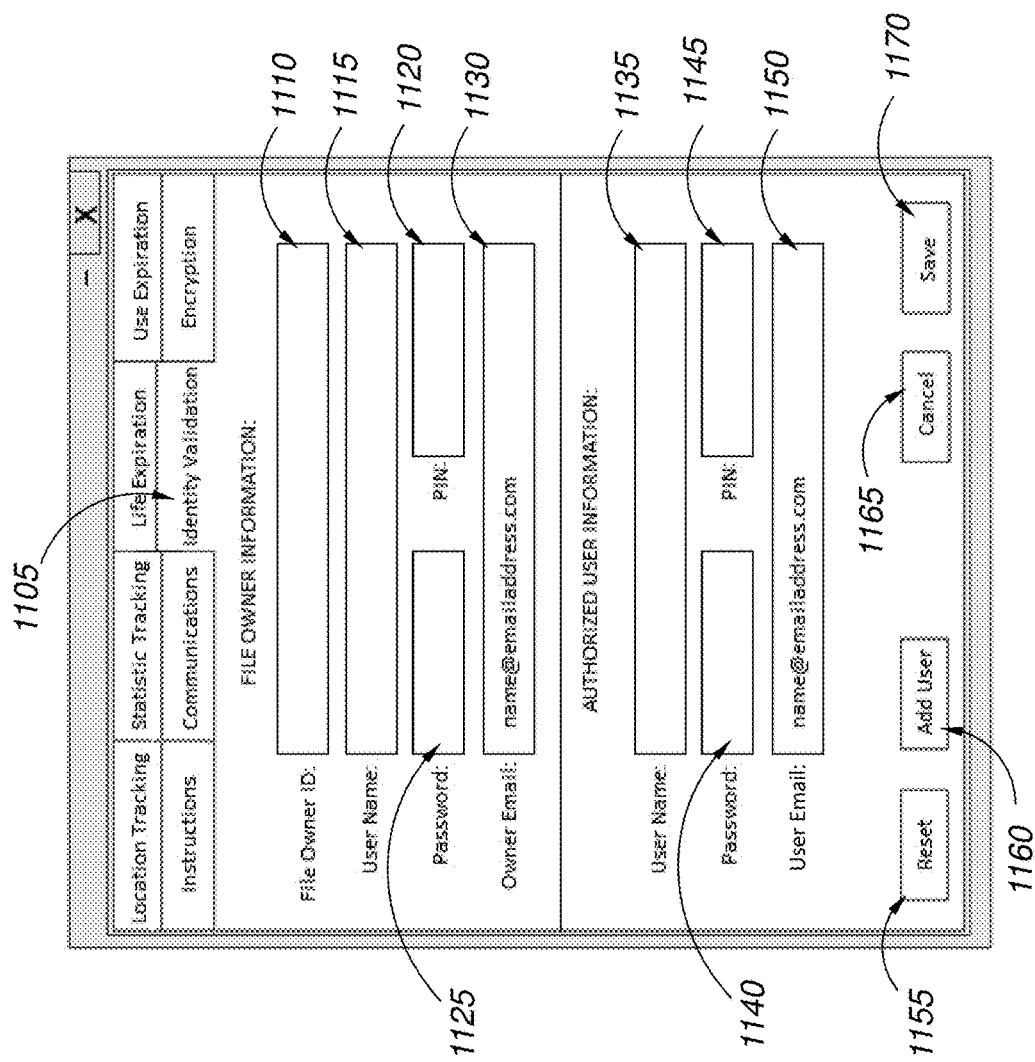
FIG. 11 is an illustration showing the identity validation user interface screen as provided within the ARC.

As can be seen in FIG. 11, the identity validation 1105 user interface screen allows the digital content owner to enter their respective identification information. It is important to note that if the ARC is being deployed as a subsystem to a primary host system, such as being deployed as a component of the PINApp system, then all user identification entered into the ARC must match exactly the information provided by the user to the host PINApp system.

Primary information collected on the identity validation 1105 user interface screen includes (but is not limited to) the File Owner ID 1110, which can be any identifier the digital content owner wishes to use to identify themselves to the ARC; a User Name 1115, which can consist of any combination of numbers, letters and other characters as desired by the digital content owner; a Password 1125 which (again) can consist of any combination of numbers, letters, and characters as desired by the digital content owner; a PIN 1120 number, and an Owner Email 1130 which will contain the primary email address of the digital content owner. In this example, the owner email 1130 will be utilized by the ARC (via the communications module as explained in FIG. 10) to send back information from the ARC to the digital content owner. It is important to note that the email address entered on the identity validation 1105 user interface screen does not need to match the email contact information provided on the communications user interface screen discussed with reference to FIG. 10.

The identity validation 1105 user interface screen also provides the digital content owner with a space in which to add authorized user information, for use in cases where the ARC profile will grant access to one or more recipients who need access to the digital content protected and managed within the ARC. The authorized user information includes the user name 1135, a user password 1140, a user PIN 1145 and a user email 1150. In cases where the digital content owner wishes to add multiple secondary users (or recipients of an ARC profile), the digital content owner can select the add user 1160 option and enter the additional secondary user (recipient) information. Please note that the identity validation 1105 user interface screen information provided with reference to FIG. 11 is limited in scope to show general functionality of the preferred embodiments. Other identifying information such as employee ID numbers, social security numbers, patient or client ID numbers, and the like may also be used as identification within ARC.

Once the digital content owner has completed entering the required information into the identity validation 1105 user interface screen, the digital content owner may choose to save 1170 the settings made during the session. Selecting save 1170 will save all currently selected settings and options, and close the identity validation 1105 user interface screen, returning the digital content owner to the previous (instructions user interface screen as detailed in FIG. 9) screen. The digital content owner may also choose to reset 1155 all settings on the identity validation 1105 user interface screen. Selecting reset 1155 will remove any and all provisioning options on the identity validation 1105 user interface screen (including all digital content owner and authorized user information), effectively clearing all information entered, and leaving the selections blank. The digital content owner may also choose to cancel 1165 any changes or settings applied during the session on the identity validation 1105 user interface screen, which would cause the identity validation 1105 user interface screen to close, returning the digital content owner to the previous (instructions user interface screen as detailed in FIG. 9) screen.

The encryption capabilities of the ARC will now be discussed with reference to FIG. 12. Please note that the ARC may utilize proprietary encryption methods, or may incorporate currently available encryption methods. For the purpose of easing the explanation of the encryption management function, this submission focuses on applying encryption to the ARC profile, and not the functionality of the encryption used in the example(s).

Figure 12:
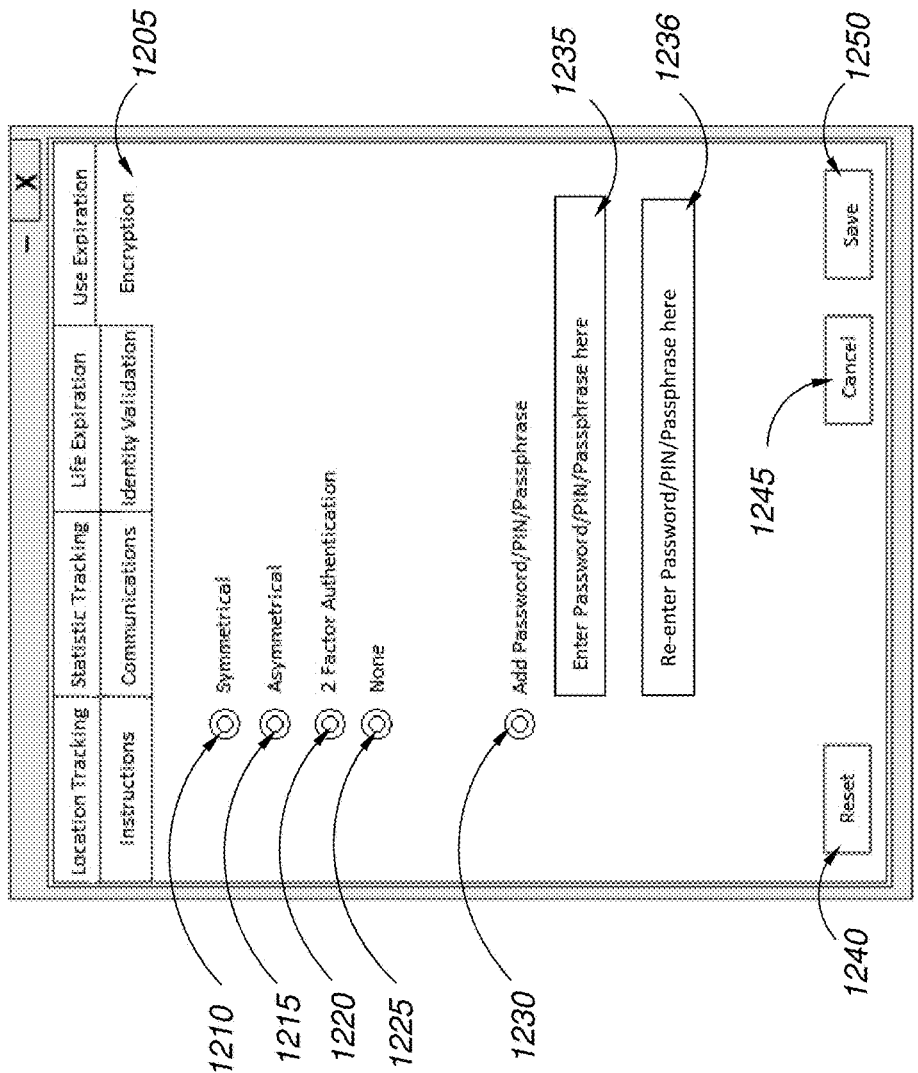
FIG. 12 is an illustration showing the encryption user interface screen as provided within the ARC.

Referring to FIG. 12, the encryption 1205 user interface screen provides the digital content owner with option settings to apply a variety of encryption methods to the ARC profile. By selecting the appropriate option, the digital content owner can apply symmetrical 1210 encryption, asymmetrical 1215 encryption, 2 factor authentication 1220 or none 1225, indicating that no encryption mechanism will be applied to the ARC profile. The ARC will allow only a single type of encryption to be applied to each ARC profile created. In addition to the encryption settings provided, the digital content owner may also choose to add an additional password, PIN, or passphrase by selecting the appropriate option 1230. Once the add password/pin/passphrase option 1230 has been selected, the digital content owner may enter the desired password, PIN, or passphrase into the appropriate field 1235. The encryption 1205 user interface screen requires that any password, PIN, or passphrase added 1235 must be re-entered in the appropriate field 1236 before the password, PIN, or passphrase can be validated and saved. This password, PIN, or passphrase 1235 will be required by the ARC profile, in addition to any of the previously selected encryption methods that have been applied to the ARC profile. In one embodiment, the digital content owner may choose to not apply any encryption methods to the ARC profile, but may wish to apply the password, PIN, or passphrase 1230/1235/1236 protection to the ARC profile. The digital content owner will be required to provide the password, PIN, or passphrase to the one or more recipients of the ARC profile to allow the recipient(s) to gain access to the ARC profile and the digital content being managed within the ARC.

Once the digital content owner has made the provisioning selections as described above, they can then save 1250 their settings, which will close the encryption 1205 user interface screen, and return the digital content owner to the previous (instructions user interface screen as detailed in FIG. 9) screen. The digital content owner may also choose to cancel 1245 any changes or settings applied during the session on the encryption 1205 user interface screen, which would cause the encryption 1205 user interface screen to close, returning the digital content owner to the previous (instructions user interface screen as detailed in FIG. 9) screen. Selecting reset 1240 will cause all of the settings on the encryption 1205 user interface screen to return to their default settings, removing all selections including any added password, PIN, or passphrase 1235/1236 information.

It is not necessary to apply encryption settings to the ARC profile in order for it to function properly. Encryption, like many other provisions provided within the ARC is optional and may be incorporated at the discretion of the digital content owner.

Figure 13:
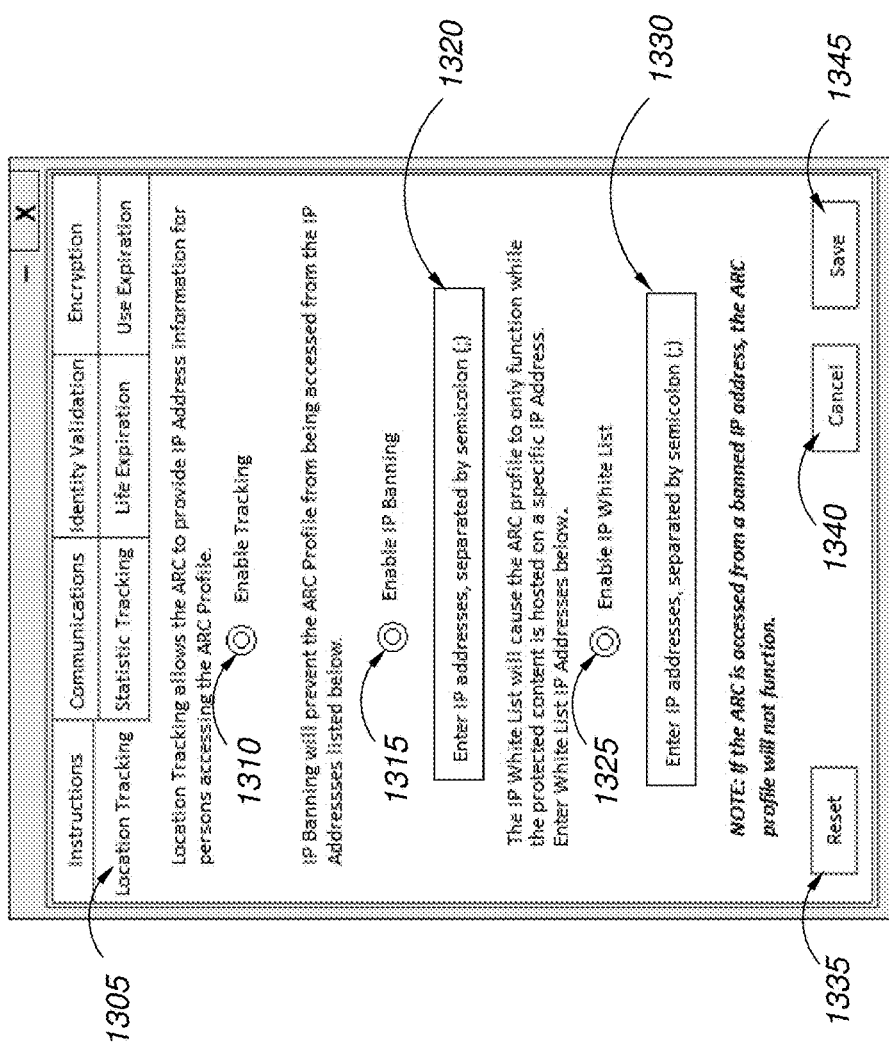
FIG. 13 is an illustration showing the location tracking user interface screen as provided within the ARC.

The location tracking function and settings will now be discussed with reference to FIG. 13. The ARC provides a location tracking 1305 user interface screen wherein the digital content owner may select from a variety of location tracking options and capabilities to add control mechanisms to the ARC profile. The digital content owner may choose to enable the ARC to collect geographical information such as IP address data for locations that access the ARC profile by selecting enable tracking 1310. Once activated, the ARC will begin collecting geolocation information and storing the data in the ARC database (not shown). In addition to tracking and storing the geolocation data, the digital content owner can also choose to prevent the ARC profile from functioning when accessed by a specific IP address, or multiple IP addresses by enabling IP banning 1315. The enable IP banning 1315 function works in conjunction with the IP address entry field 1320 wherein the digital content owner may enter a list of IP addresses that will be disallowed by the ARC. Functionally, if the ARC profile is accessed from an IP address that appears on the banned 1320 list, the ARC profile will cease to function, ignoring all commands and input, even if they are from a valid recipient. If the ARC profile is accessed from an IP that is not on the banned list, the ARC profile will function normally.

The location tracking 1305 user interface screen also allows the digital content owner to enable an IP white list 1325. The function of the white list is to allow the digital content owner to provision the ARC to accept IP addresses that may otherwise be suspect to the internet service provider. The digital content owner may enable the IP white list 1325 by selecting the appropriate option 1325. Once selected, IP addresses may be added to the list in the field provided 1330. In instances where an IP address occurs on both the IP banned list 1320 and the IP white list 1330, the IP white list 1330 will take precedence.

Once the digital content owner has made the provisioning selections as described above, they can then save 1345 their settings, which will close the location tracking 1305 user interface screen, and return the digital content owner to the previous (instructions user interface screen as detailed in FIG. 9) screen. The digital content owner may also choose to cancel 1340 any changes or settings applied during the session on the location tracking 1305 user interface screen, which would cause the location tracking 1305 user interface screen to close, returning the digital content owner to the previous (instructions user interface screen as detailed in FIG. 9) screen. Selecting reset 1335 will cause all of the settings on the location tracking 1305 user interface screen to return to their default settings, removing all selections including any banned IP addresses 1320, or any white listed IP addresses 1330.

Figure 14:
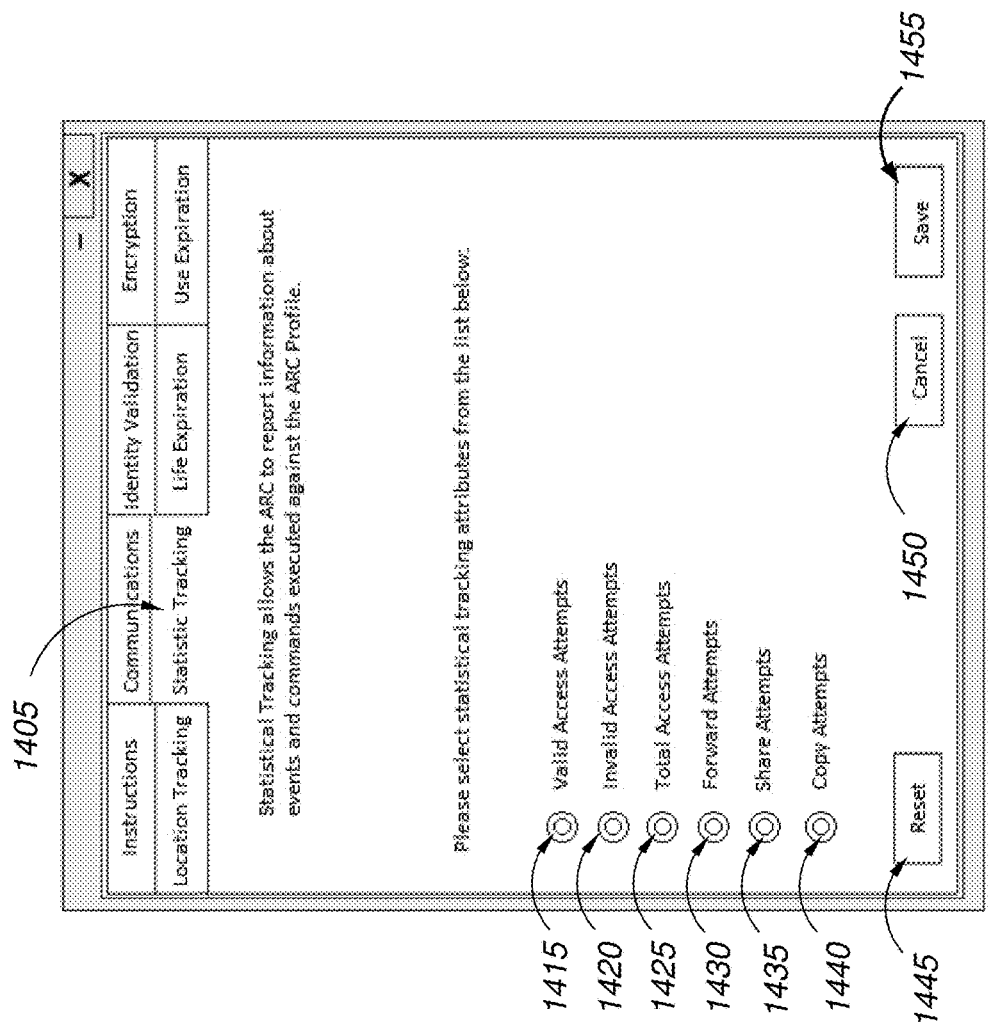
FIG. 14 is an illustration showing the statistic tracking user interface screen as provided within the ARC.

The statistic tracking function will now be discussed with reference to FIG. 14. Please note that while other aspects of statistical tracking are provided by the ARC, only the most commonly used options are provided for discussion. This is to ease explanation of the primary features of the ARC. As can be seen in FIG. 14, the ARC provides a statistic tracking 1405 user interface screen. The digital content owner can instruct the ARC to track activities such as valid access attempts 1415, invalid access attempts 1420, total access attempts 1425, forward attempts 1430, share attempts 1435, and copy attempts 1440. As previously stated, other statistical information may be collected and tracked by the ARC. The list of attributes being tracked in FIG. 14 was limited to ease explanation of the ARC functionality.

In one preferred embodiment, the digital content owner may choose to track metrics such as invalid access attempts made against the ARC profile. In this scenario, the ARC will collect all invalid attempts 1420 to gain access to the ARC profile, regardless of the origin of the attempts, and store that information in the ARC database (not shown). The invalid access attempt 1420 information may then be reported back to the digital content owner through the ARC communications module (not shown) at the discretion of the digital content owner. In a like fashion, the owner may choose to track share attempts 1435, valid access attempts 1415, and other available actions that can be executed against the ARC profile, and subsequently report back to the digital content owner through the ARC communications module (not shown).

Once the digital content owner has made the provisioning selections as described above, they can then save 1455 their settings, which will close the statistic tracking 1405 user interface screen, and return the digital content owner to the previous (instructions user interface screen as detailed in FIG. 9) screen. The digital content owner may also choose to cancel 1450 any changes or settings applied during the session on the statistic tracking 1405 user interface screen, which would cause the statistic tracking 1405 user interface screen to close, returning the digital content owner to the previous (instructions user interface screen as detailed in FIG. 9) screen. Selecting reset 1445 will cause all of the settings on the statistic tracking 1405 user interface screen to return to their default settings, removing all selections. As with all options and provisioning settings within the ARC, it is not required that the digital content owner enable or otherwise utilize the statistic tracking 1405 function.

Figure 15:
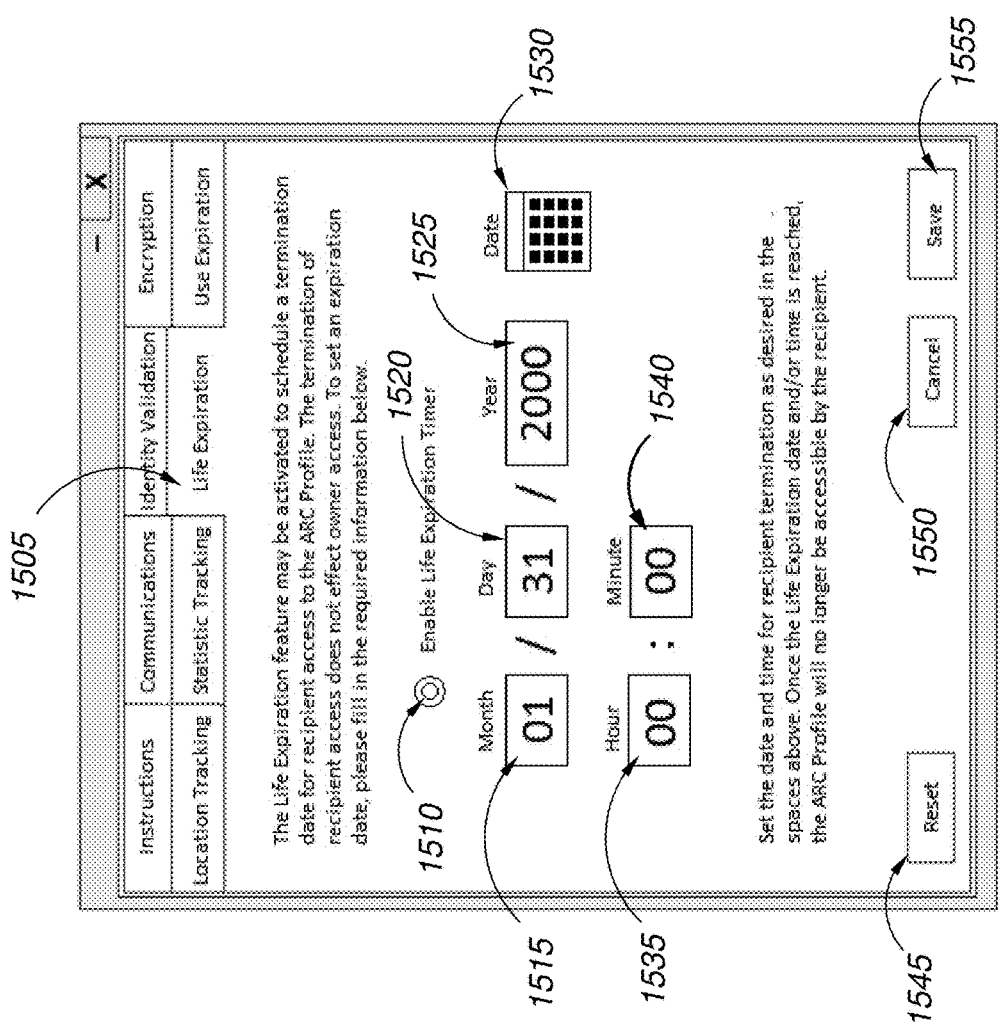
FIG. 15 is an illustration showing the life expiration user interface screen as provided within the ARC.

FIG. 15 shows the life expiration 1505 user interface screen. The life expiration 1505 user interface screen provides the digital content owner with the capability to apply a "time to live" type function to the ARC profile, and the associated digital content being managed by the ARC profile. The digital content owner may enable the life expiration timer by selecting the appropriate option 1510. Once selected, the ARC profile will operate normally until the expiration month 1515, day 1520, year 1525, hour 1535 and minute 1540 occur. Then the life expiration timer 1510 will terminate all activity and functionality of the ARC profile and the digital content being managed by the ARC profile. The settings provisioned in the life expiration 1505 user interface screen will override any other limitations or parameters provisioned within the ARC profile, such as use expiration (not pictured). The digital content owner may individually select the month 1515, day 1520 and year 1525 by populating the required information in the field(s) provided. The digital content owner may also choose to use the calendar 1530 function to select the required date information. The hour 1535 and minute 1540 of expiration may also be provisioned by entering the required information in the field(s) provided. If no time is entered in the hour 1535 or minute 1540 spaces, and the enable life expiration timer 1510 is selected, then the ARC profile will cease to function at the beginning of the calendar day selected/provided in the date (1515, 1520 & 1525) fields. If the enable life expiration timer 1510 is disabled, then the ARC profile will ignore any information provisioned in the date (1515, 1520 & 1525) and time (1535 & 1540) fields and function based on the provisioning of the other settings as configured by the digital content owner. In one embodiment of the life expiration timer 1510, the timer may be disabled and the ARC profile will be governed by the use expiration timer, discussed later in this submission.

Once the digital content owner has made the provisioning selections as described above, they can then save 1555 their settings, which will close the life expiration 1505 user interface screen, and return the digital content owner to the previous (instructions user interface screen as detailed in FIG. 9) screen. The digital content owner may also choose to cancel 1550 any changes or settings applied during the session on the life expiration 1505 user interface screen, which would cause the life expiration 1505 user interface screen to close, returning the digital content owner to the previous (instructions user interface screen as detailed in FIG. 9) screen. Selecting reset 1545 will cause all of the settings on the life expiration 1505 user interface screen to return to their default settings, removing all selections. As with all options and provisioning settings within the ARC, it is not required that the digital content owner enable or otherwise utilize the life expiration 1505 function.

The use expiration function will now be discussed with reference to FIG. 16. Please note that (as stated previously) the use expiration function is subject to the settings of the life expiration function discussed in FIG. 15. The life expiration function may render the ARC profile invalid or otherwise non-usable if the life expiration settings criteria has been met, even if there are still valid use attempts remaining in the use expiration function.

Figure 16:
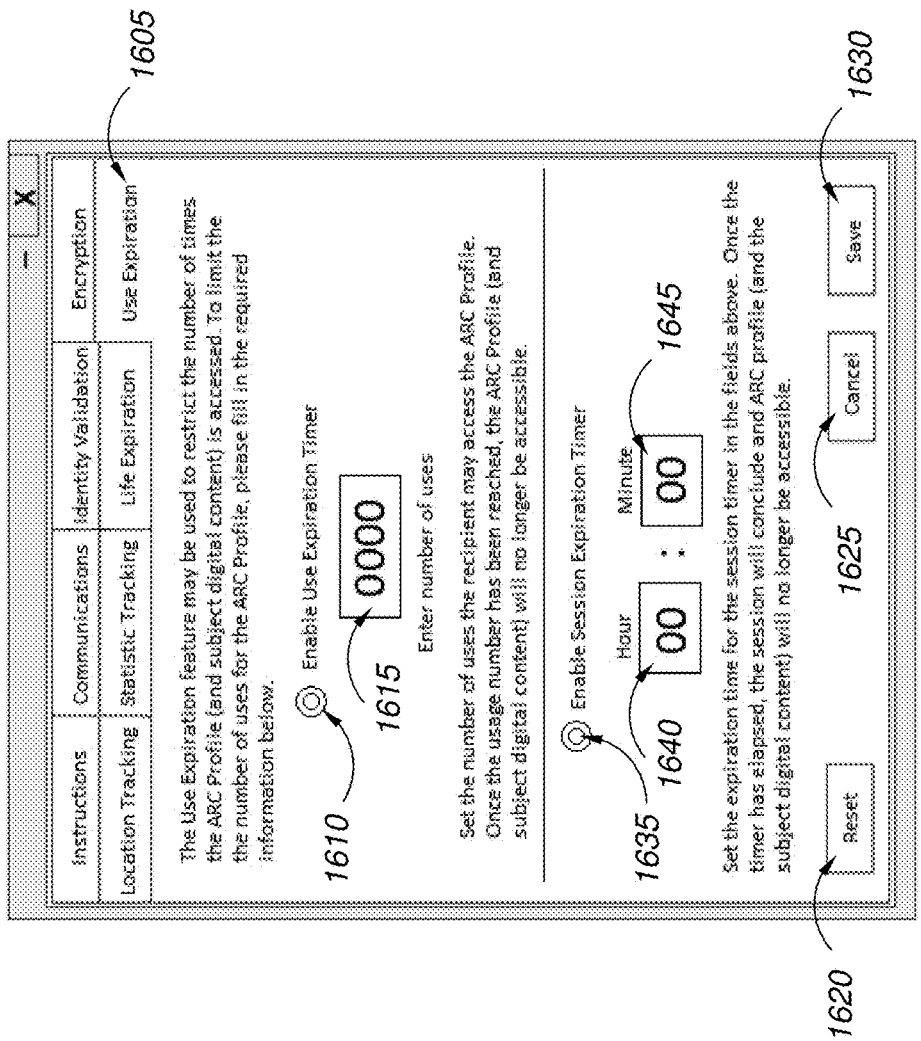
FIG. 16 is an illustration showing the use expiration user interface screen as provided within the ARC.

Referring to FIG. 16, the ARC provides a use expiration 1605 user interface screen. The use expiration 1605 user interface screen allows the digital content owner to set a maximum number of times in which the ARC profile and the associated digital content being managed by the ARC profile is accessible. The digital content owner may choose to enable the use expiration timer 1610, and then enter a number of uses 1615 the ARC profile may be available for in the field provided 1615. Once provisioned, the ARC profile will function normally until the number of uses 1615 has been exhausted. Once exhausted, the ARC profile will no longer function, disabling any and all access to the digital content being managed by the ARC profile.

The ARC profile can also be provisioned to control the length of an access session for uses wherein the digital content owner wishes to restrict access time to the ARC profile, such as a college professor giving an online test, or other time-restricted access example. The session expiration timer 1635 can be enabled or disabled, allowing the digital content owner to provision the hours 1640 and minutes 1645 an ARC profile access session can occur. While the example in FIG. 16 limits the session expiration timer 1635 to a typical 24 hour period, it will become apparent to one skilled in the art that this timer may be embodied to capture virtually any combination of time periods that may be associated with a session. It is also important to note that the session expiration timer 1635 works in conjunction with the use expiration timer 1610 in that one timer may override the other. As an example, if the number of uses as provisioned by the use expiration timer 1615 has elapsed, the ARC profile will cease to function, denying access to any authorized recipient, without regard for the provisioning of the session timer 1635. The session timer 1635 is designed to specifically govern the access time allotted for each use. In instances wherein the use expiration timer 1615 is disabled (allowing an infinite number of uses), each of the uses will continue to be governed by the provisioning of the session timer 1635. Once the digital content owner has made the provisioning selections as described above, they can then save 1630 their settings, which will close the use expiration 1605 user interface screen, and return the digital content owner to the previous (instructions user interface screen as detailed in FIG. 9) screen. The digital content owner may also choose to cancel 1625 any changes or settings applied during the session on the use expiration 1605 user interface screen, which would cause the use expiration 1605 user interface screen to close, returning the digital content owner to the previous (instructions user interface screen as detailed in FIG. 9) screen. Selecting reset 1620 will cause all of the settings on the use expiration 1605 user interface screen to return to their default settings, removing all selections. As with all options and provisioning settings within the ARC, it is not required that the digital content owner enable or otherwise utilize the use expiration 1605 function.

Once all the provisioning and settings have been configured by the digital content owner, they may choose freely what they wish to do with the ARC profile and the associated digital content being managed by the ARC profile. The ARC profile may be stored, transferred, or otherwise transmitted between devices and/or secondary users/recipients, provided the usage does not conflict with the provisioning as set by the digital content owner.

Figure 17:
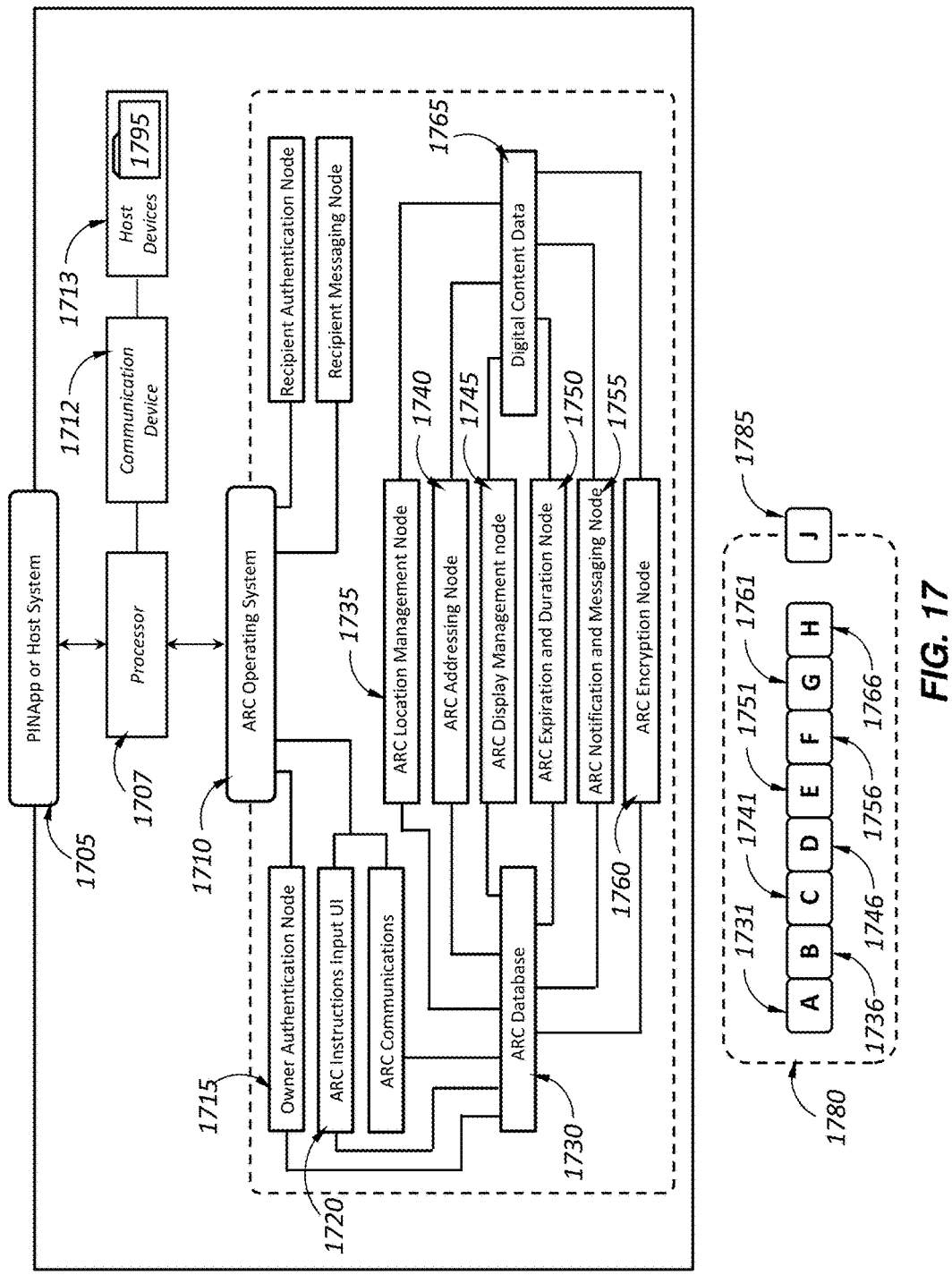
FIG. 17 is a flow diagram illustrating the creation of the ARC for use in a digital environment.

The creation and usage of an ARC profile will now be discussed with reference to FIG. 17. FIG. 17 illustrates the process of creating an ARC profile for the purpose of allowing a recipient to access digital content that is managed through the ARC. The lesser aspects of the discussion such as smartphones, tablets, computers, and other input devices are not displayed to ease understanding of the core components used to create the ARC profile. In the following discussion, we will assume the digital content owner wishes to create an ARC profile to allow a recipient to access a video file that resides on one of the devices the digital content owner owns, manages, and controls, and that is connected to the ARC system via the PINApp host system.

As a brief overview (referring to FIG. 17), the top section of the diagram illustrates the PINApp or host system 1705 engaging a processor 1707 to facilitate operations between the PINApp or host system 1705 and the ARC operating system 1710. The processor 1707 is also connected to a communication device 1712 such as a network or other interface allowing external communications, and subsequent host devices 1713 such as servers, smartphones, tablets, computers, and other devices capable of both storing and transferring digital content within a digital realm. The lower section of FIG. 17 illustrates the modules (A through J) that make up the completed ARC profile 1780 on the bottom of the FIG. 17. For the purpose of easing understanding of the ARC creation, the modules (A through J) represent specific functional elements and attributes assigned to digital content being controlled and/or managed by the ARC in the creation of the ARC profile 1780 utilized to manage digital content. The quantity of controls and restrictions in this example (with reference to FIG. 17) are limited to ease understanding of the creation of the ARC profile 1780. It will become obvious to one skilled in the art that a virtually limitless set of control aspects may be attached to create an ARC profile. The example referenced in FIG. 17 is not intended to limit the scope of the ARC profile 1780, or the creation thereof.

Creation of the ARC profile 1780 begins with a digital content owner (not shown) logging into the host (PINApp 1705) system, and subsequently the ARC operating system 1710 through the owner authentication node 1715. The owner authentication node 1715 works in conjunction with the ARC database 1730 as well as the host system (PINApp 1705) to ensure the identity of the digital content owner wishing to access the ARC. FIG. 17 assumes the identification information for the digital content owner in the PINApp or host system 1705 database (not shown) matches the identification information stored in the ARC database 1730, which subsequently allows the digital content owner (not shown) to access the ARC system.

Now that the identity of the digital content owner (not shown) is validated by the ARC operating system 1710 and the PINApp or host system 1705, the digital content owner (not shown) can begin creating an ARC profile 1780 by selecting one or more digital content files 1795 they wish to allow for recipient (or third party) access. For the purpose of this example, we will assume the digital content file 1795 is a video file. The video file is hosted on one of the host devices 1713, and represented in FIG. 17 as digital content file 1795. The host devices 1713 housing the video file (as represented by digital content file 1795) can be (but are not limited to) external hard drives, cloud storage drives, smart devices such as tablets and smartphones, laptop computers, and/or other computing devices that are capable of storing digital content.

The digital content owner (not shown) will access the ARC instructions input UI 1720 and select the digital content file 1795 (video file) they wish to transfer to, or otherwise allow access to, by the recipient utilizing the ARC. Once selected, the ARC instructions input UI 1720 will communicate the digital content file selection and appropriate physical location information to the ARC database 1730. It is important to note that the ARC profile does not contain a copy of the digital content file 1795 itself, but rather contains digital content data 1765, which may include the file name, file size, file type and other attributes of the digital content file as provisioned by the digital content owner. Since the PINApp or host system 1705 in this example supports flexibility in storage for digital content, moving the subject digital content file 1795 to another storage device will not adversely affect the ARC profile 1780. The ARC operating system 1710 will notify the ARC database 1730 of the associated movement of the digital content file 1795 and update all ARC profiles utilizing updated location information accordingly. The ARC database 1730 will store the updated ARC profile 1780 information for all associated profiles.

Once the ARC database 1730 has stored the file name, file size, file type and has verified the physical location of the subject digital content file 1795, it will notify the ARC location management node 1735 to attach the associated digital content data 1765 to the new ARC profile 1780 being generated. Again, the digital content file 1795 itself is not moved, copied or otherwise relocated during this process. The digital content data 1765 being attached to the ARC profile may be the file name, file type, file size and location data, allowing the ARC to validate the location and establish a link between the digital content itself (the video file) and the ARC profile. The ARC location management node 1735 will continuously track the location of the digital content file 1795 and keep the ARC database 1730 updated as to the current location to ensure the integrity of all ARC profiles (including 1780) associated with the subject digital content file 1795. The digital content data 1765 (e.g., file name, file type, file size, etc) is now added to a newly generated ARC profile 1780 as represented by block-A 1731. The ARC profile itself will never contain the actual digital content being managed (in this example a video file). The ARC profile will only allow access to the digital content file 1795, as provisioned by the digital content owner. While this access may provide the recipient(s) the ability to download the subject digital content, the actual digital content file 1795 is never contained or provided within the ARC profile itself. This is to limit the size of the ARC profile, easing the management, transfer and sharing of the ARC profile.

The ARC location management node 1735 will track the location of the subject digital content file 1795. As previously stated, this digital content file 1795 currently resides on a host device 1713 as part of the PINApp or host system 1705. If/when the digital content file 1795 is ever moved to a different device, or otherwise changes location relative to the current host device 1713, the ARC location management node 1735 will update the location information accordingly. The location information may be a URL, file path, or the like. This location information is stored by the ARC database 1730 and the subsequent location information becomes a part of the newly created ARC profile 1780 as block-B 1736. It is important to note that each block shown (A through J shown on bottom of FIG. 17) represent the content, sequencing, and the functional management modules that make up the ARC profile 1780.

Now that the digital content owner (not shown) has selected the video file (digital content file 1795) they wish to allow for recipient (or third party) access (and recorded the file name, file size, file type and other attribute data as digital content data within the ARC profile 1780 as block-A 1731) and the location of that video file (digital content file 1795) is recorded within the ARC profile 1780 (as block-B 1736) they can select attributes to govern the access and usage of the digital content file 1795 hosted within the ARC profile 1780. Again, please note that block-A 1731 contains information relating to the file name, physical size and file type of the digital content file 1795 being managed through the ARC, and does not contain the physical digital content file itself.

The digital content owner will now provide recipient information for inclusion in the ARC profile 1780. For the purpose of this example with reference to FIG. 17, recipient information managed through the ARC will be configured based on the host system (PINApp 1705) user database information. In instances where the ARC is deployed as a stand-alone management tool, the recipient information will be entered into the ARC system and stored in the ARC database 1730.

With reference to FIG. 17, the ARC addressing node 1740 manages recipient addressing to control access to the contents (digital content data 1765) managed within the ARC profile 1780. The digital content owner (not shown) will enter an identifier into the ARC instructions input UI 1720 (in this example, an employee ID number) to indicate the recipient(s) who will be given access to the subject digital content file 1795 managed within the ARC profile 1780. The ARC database 1730 will record the recipient identifier information for future retention and to ensure the integrity of the ARC profile 1780 being created. The addressing (recipient(s)) information will be stored within the newly created ARC profile 1780 as block-C 1741.

The next component for creation of the profile will be the display and rendering information (created by the ARC display management node 1745) for the digital content file 1795. Since the digital content file 1795 is a video, the ARC display management node 1745 will provide criteria such as screen formatting, color composition, file playback formatting, and the like. Engaging with the ARC instructions input UI 1720, the digital content owner notes that the digital content file 1795 is an MP4-type file. While the ARC can manage a virtually unlimited number of digital content formats, the MP4 designation is used to ease explanation of the creation of the ARC profile 1780. As the MP4 designation is selected, the ARC instructions input UI 1720 shares this information with the ARC database 1730, which subsequently stores it with reference to the subject ARC profile 1780 being created. The ARC database 1730 instructs the ARC display management node 1745 to provision the ARC profile 1780 to render and/or display the digital content file 1795 (video file) as an MP4 file. The ARC display management node 1745 adds the display and content formatting information (MP4) to the ARC profile 1780 being created. The MP4 and other display and rendering information created is stored as block-D 1746 within the ARC profile 1780.

The next step in the creation of the ARC profile 1780 (with continued reference to FIG. 17) is the expiration and/or usage duration of the digital content file 1795, which is controlled by the ARC expiration and duration node 1750. To ease explanation and understanding of the functional aspects of the ARC, this discussion assumes the digital content file 1795 will be available to the recipient for an indefinite period of time, and an indefinite number of usages. The ARC is capable of allowing the digital content owner to put specific usage numbers and/or expiration dates and times on digital content being managed through the ARC.

The digital content owner (not shown), through the ARC instructions input UI 1720 enters "never expire" as the expiration date and the number of uses at "infinite" for the digital content file 1795. The ARC instructions input UI 1720 shares this command information with the ARC database 1730. The ARC database 1730 stores the expiration and usage criteria for the ARC profile 1780 and instructs the ARC expiration and duration node 1750 to set the digital content file 1795 to never expire, and to allow infinite uses. These usage and duration parameters are stored as block-E 1751 of the ARC profile 1780. Please note that the ARC profile 1780 data as individual blocks of data (blocks A through J) as well as the completed profile 1780 itself are stored within the ARC database 1730.

The next step in the creation of the ARC profile 1780 is the option to create a personalized message to accompany the digital content file 1795 that will be managed and/or transferred to the subject recipient through the ARC. The ARC notification and messaging node 1755 is provided to enable the creation of personalized messages as well as to manage any communication from the host to the recipient, or to manage any ARC system level notifications that need to be shared with a host or recipient. In addition to personal messages from the digital content host to a recipient or group of recipients, messages that can be generated through the ARC notification and messaging node 1755 can include (but are not limited to) notifying the digital content owner when the digital content file 1795 is accessed by a recipient, the number of times the digital content file is accessed by a recipient, any confirmation and/or error messages being communicated from the ARC operating system 1710 to the PINApp or host system 1705, and the like.

For the purpose of this example (with continued reference to FIG. 17), the digital content owner creating the ARC profile 1780 will include a message stating "here is the file you requested". The digital content owner (not shown) will enter the reference message into the ARC instructions input UI 1720. The message will then be transferred to the ARC database 1730 for storage. The ARC database 1730 will engage the ARC notification and messaging node 1755, providing instructions to attach the subject message ("here is the file you requested") to the digital content file 1795. The messaging information provided from the ARC notification and messaging node 1755 is thus associated to the digital content file 1795. The messaging information is then added to the ARC profile 1780 as block-F 1756. As is the case with all ARC profile 1780 information, the ARC database 1730 will host both the individual elements (blocks A through J) that make up the ARC profile 1780, as well as the completed ARC profile 1780.

The next step in the creation of the ARC profile 1780 (with continued reference to FIG. 17) is the addition of encryption to protect the digital content data 1765 and the ARC profile 1780. Through the ARC instructions input UI 1720, the digital content owner (not pictured) will select the appropriate encryption to protect the subject ARC profile 1780. Encryption methodologies may be dictated by the host system (PINApp 1705) or may be dictated by the ARC operating system 1710, should the ARC be deployed as a stand-alone digital content management tool. For the purpose of this example, we will assume the digital content owner wishes to employ 2-factor (pin and token) authentication to the subject ARC profile 1780. From the ARC instructions input UI 1720, the digital content owner will select 2-factor authentication. The selection is passed to the ARC database 1730 for storage. The ARC database 1730 will then engage the ARC encryption node 1760 and set the encryption parameters for the digital content data 1765 to 2-factor authentication. The 2-factor authentication information is attached to the ARC profile 1780 as block-G 1761.

As with all control parameters added to the ARC profile 1780, the ARC database 1730 will store the completed ARC profile 1780 blocks-A through J for future retention, and to ensure the integrity of each ARC profile 1780 being created. Block-H 1766 represents the ARC database 1730 information for the subject ARC profile 1780. The ARC database 1730 information contained in Block-H 1766 includes (but is not limited to) a summary of all blocks thus far (A through G) in addition to the digital content owner identification information, a summary overview of the digital content file 1795 being managed through the ARC profile 1780, the host devices 1713 physical addressing and MAC information, as well as a stamp providing the date, time, device, operating system, and other information specific to the device wherein the ARC profile 1780 was created. The above information, along with all previously disclosed blocks (A through G) are summarized within the ARC profile 1780 as block-H 1766.

With continued reference to FIG. 17, the final step in the creation of an ARC profile 1780 is the algorithm that encapsulates the referenced blocks of data (blocks A through J) and renders the coding into a format that can be easily managed through the host (PINApp 1705) system as well as the recipient device(s) (not shown) that will be allowed access to the subject digital content file 1795 managed by the ARC profile 1780. The encapsulation of the ARC profile 1780 is represented by block-J 1785 of FIG. 17.

The process of encapsulation (block-J 1785) begins when the digital content owner has indicated through the ARC instructions input UI 1720 that the creation of the ARC profile 1780 is completed. The ARC instructions input UI 1720 notifies the ARC operating system 1710 of the completed ARC profile 1780, and the ARC operating system 1710 begins the encapsulation process to create the completed profile block-J 1785. Once the encapsulation process has been completed, the ARC operating system 1710 notifies the ARC database 1730 that the creation of the subject ARC profile 1780 has been successfully completed. The ARC database 1730 will store the completed ARC profile 1780 as well as the encapsulation information represented as block-J 1785. The ARC database 1730 will store all block information (A through J) as separate components. Each encapsulation event is created using a prediction resistant algorithm to ensure the integrity of the ARC profile, and to ensure that hacking or otherwise breaching the ARC profile 1780 to access the digital content file 1795 is discouraged. The encapsulation of the ARC profile 1780 (as represented by block-J 1785) takes place with each newly created ARC profile, regardless of the encryption methodology (block-G 1761) chosen to protect the ARC profile 1780 during transit between devices, recipients, and/or networks.

As stated previously, all ARC profiles (including ARC profile 1780) are stored in the ARC database 1730 for retention and access through both the host system (PINApp or other host system 1705) or can also be accessed from the ARC database 1730 via the ARC instructions input UI 1720 at any time.

Completed ARC profiles can be stored within the host system as stated above, as well as being transferred to one or more recipients for the purpose of allowing the one or more recipients to gain access to the digital content being managed through the ARC.

The process of allowing recipient access to digital content (i.e., digital content files) being managed through the ARC will now be discussed with reference to FIG. 18. Please note that while other capabilities for the transfer and/or access of digital content likely exist through the host system, the following discussion will be limited to the management of digital content between a single digital content owner and a single recipient of the subject digital content. The recipient of digital content that is made available through the ARC is not required to be registered to, or otherwise logged into any system of any kind. The recipient only needs to be on a device such as a smartphone, tablet, or other computing device that provides an internet connection. The following example (with reference to FIG. 18) assumes the ARC profile discussed in FIG. 17 is already created, and we are now in the process of allowing the recipient access to the ARC profile, and the subsequent digital content. Please keep in mind that the purpose of FIG. 18 is to show the primary elements engaged in the actual recipient engagement of the digital content being managed through the ARC, and is not intended to expand on the functionality previously disclosed with reference to FIG. 17 above.

Figure 18:
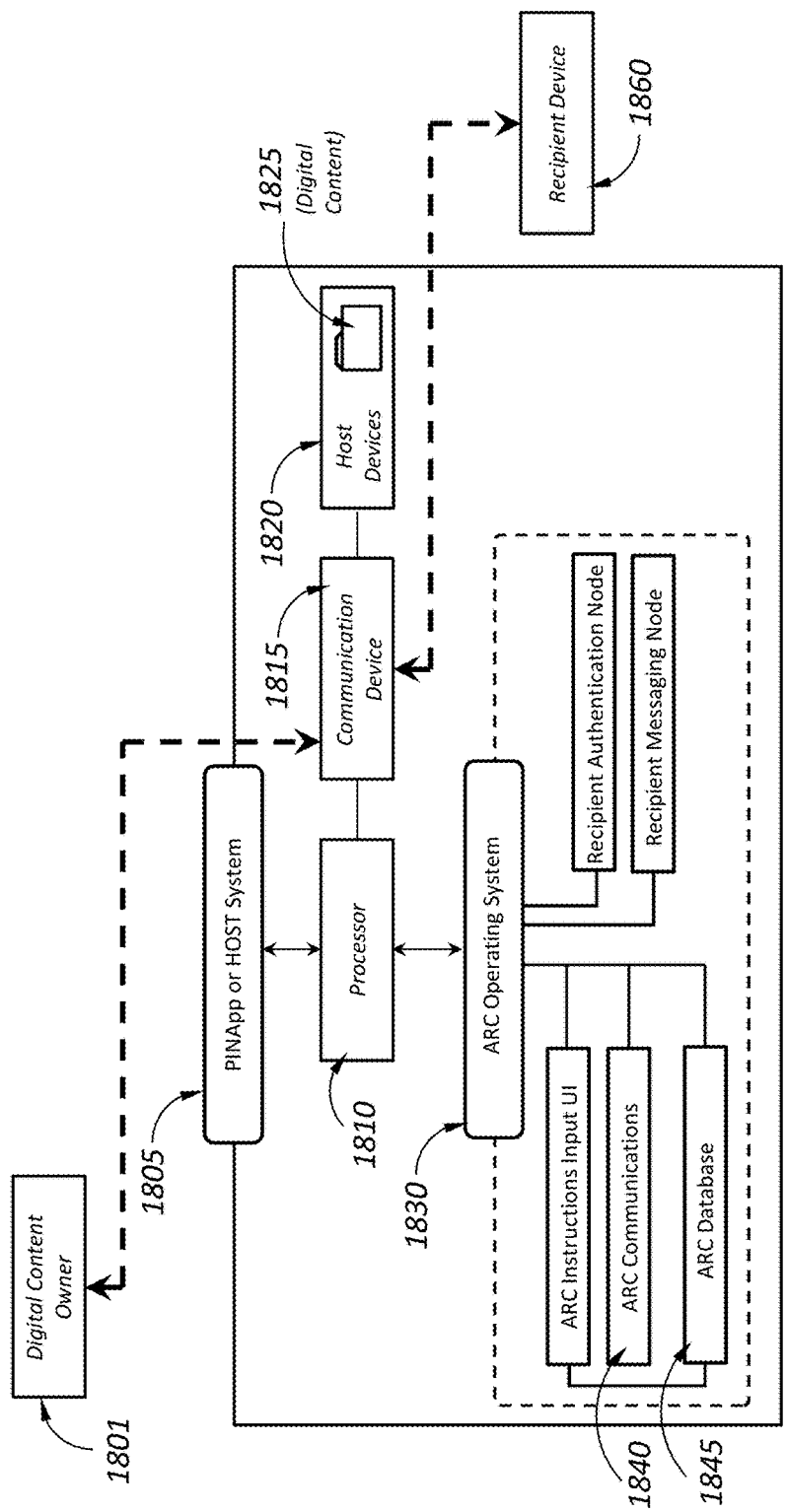
FIG. 18 is a block diagram illustrating the engagement of an ARC profile between a digital content owner and one or more recipients.

With reference to FIG. 18, the process of allowing a recipient device 1860 access to digital content 1825, such as a digital file, that is managed by the ARC begins with the digital content owner 1801. The digital content owner 1801 is connected to the PINApp or other host system 1805 via a communication device 1815. The digital content owner 1801 device can be (but is not limited to) a personal computer, tablet computer, smartphone, or other computing device capable of communicating with other computerized devices. As previously stated, the ARC profile representing the digital content 1825 has already been created, so allowing access to the subject digital content 1825 may begin.

The digital content owner 1801 notifies the recipient device 1860, through a communication device 1815 that is a component of the PINApp or host system 1805 that digital content 1825 may be accessed by the recipient device 1860. This notification (not shown) can come in the form of a text-type message, an email, a chat, or other commonly occurring digital notification methodology. Upon receiving the notification (not shown) the recipient device 1860 will access the ARC profile information (not shown) provided in the notification. The ARC profile information can take the form of a redirection, an electronic or digital link, an image, a digital button, or other actionable mechanism that can be transferred between parties utilizing commonly occurring digital messaging services.

Upon accessing the ARC profile (not shown) the recipient device 1860 will communicate the access indication from the recipient (device 1860) to the communication device 1815 hosted within the PINApp or host system 1805. The communication device 1815 will notify the processor 1810 of the access of the ARC profile. The processor 1810 will, in turn, notify the ARC operating system 1830. The ARC operating system will search the ARC database 1845 for the ARC profile that was selected by the recipient device 1860. If the ARC profile is active within the ARC database 1845, and has not otherwise been revoked, removed, deleted, or retracted by the digital content owner 1801, the ARC database 1845 will reply to the ARC operating system 1830 (via the ARC communications 1840) that (A) the ARC profile is active and (B) the location of the digital content 1825 being managed through the ARC profile. In this example, the digital content 1825 is being stored on a host device 1820 such as a hard drive, computer, tablet, cloud storage drive, smartphone, or other computing device that is owned and/or managed by the digital content owner 1801.

Now that the ARC database 1845 (via the ARC communications 1840) has notified the ARC operating system 1830 that the subject ARC profile is active and the locations of the digital content, the ARC operating system 1830 reviews the contents of the ARC profile and executes the command set created by the digital content owner 1801 to allow the recipient device 1860 access to the digital content 1825 being managed within the ARC profile.

The first step required for the recipient device 1860 to access the digital content 1825 managed via the subject ARC profile is for the recipient device 1860 to verify their identity. For the purposes of this discussion, the recipient is a co-worker. The identification verification process begins with the recipient device 1860 entering their employee ID number (not shown). Once the employee ID number is entered into the recipient device 1860, it is processed through the communication device 1815 and subsequently the PINApp or host system 1805 processor 1810. The processor 1810 will communicate to the ARC operating system 1830 the appropriate employee identification number with the ARC database 1845. Assuming the employee ID number matches the ID number stored within the ARC profile hosted in the ARC database 1845, the ARC communications 1840 will instruct the ARC operating system 1830 to execute the ARC profile command set. Again, the ARC profile contains rules, permissions, restrictions, and access rights for the subject digital content 1825 that was created previously during the discussion with reference to FIG. 17.

Included in the ARC profile rules is the encryption methodology (e.g. 2-factor authentication) chosen by the digital content owner 1801 (as previously discussed with reference to FIG. 17) to be utilized for accessing the digital content 1825 being managed by the subject ARC profile. Once the recipient device 1860 has completed authentication (via the entering and subsequent validation of the employee ID number) the ARC profile will send a notification from the ARC database 1845 (via the ARC communications 1840) to the ARC operating system to execute the encryption (2-factor authentication) protocol, protecting the subject digital content 1825. Assuming the execution of the 2-factor protocol by the recipient device 1860 is successful, access to the digital content 1825 will be granted to the recipient device 1860, and managed under the parameters defined by the digital content owner 1801 when the ARC profile was created (with reference to FIG. 17).

Now that access to the digital content 1825 is granted, the recipient device 1860 may access it, under the control parameters defined in the ARC profile. For the purpose of this example, we will assume the access granted to the recipient device 1860 is a on a view or read-only basis, and the digital content 1825 may not be acquired or otherwise downloaded by the recipient device 1860. With continued reference to FIG. 18, the recipient device 1860 will send a command to access the digital content 1825 being managed within the ARC profile, and residing on the host device 1820. The communication device 1815 will receive the access request from the recipient device 1860 and communicate that request to the processor 1810. The processor 1810 will engage the ARC operating system 1830 which will communicate the access command received from the recipient device 1860 to the ARC communications 1840, and subsequently the ARC database 1845. The ARC database 1845 will review the existing ARC profile and compare the access request parameters of the subject digital content 1825 with the access parameters programmed into the ARC profile by the digital content owner 1801 as discussed previously in FIG. 17. Assuming the access request by the recipient device 1860 (view-only) matches the ARC profile parameters governing the subject digital content 1825, the recipient device 1860 will be granted view-only access to the subject digital content 1825.

The ARC database 1845 will communicate to the ARC communications 1840 that view-only access is to be granted to recipient device 1860, and that the digital content owner 1801 must be notified of the access and grant request for viewing of the digital content 1825. This access grant and owner notification commands will be sent through the ARC communications 1840 to the ARC operating system 1830. The ARC operating system 1830 will notify the processor 1810 to (A) notify the PINApp or host system 1805 to send a notification to the digital content owner 1801 that the subject digital content 1825 is being accessed, and to (B) unlock and open the digital content 1825 on the current host device 1820 for viewing by the recipient. While the digital content 1825 remains on the host device 1820, and does not pass to or otherwise be transferred to the recipient device 1860, the recipient device 1860 now has view access to the digital content 1825 residing on the host device 1820.

To facilitate this newly granted view-only access to the digital content 1825, the ARC database 1845, via the ARC communications 1840 instructs the ARC operating system 1830 to establish a temporary and direct connection between the recipient device 1860 and the digital content 1825 residing on the host device 1820. The access timeframe to the subject digital content 1825 for this temporary connection is determined by the ARC profile parameters such as expiration date, expiration time, and number of uses provisioned by the digital content owner 1801 during creation of the subject ARC profile (that was discussed previously with reference to FIG. 17).

The temporary and direct connection will be created between the recipient device 1860, the communication device 1815, the host device 1820, and the subject digital content 1825 being viewed. During viewing, the processor 1810 will monitor viewing activity relating to the subject digital content 1825 and report this information to the ARC operating system 1830. The ARC operating system 1830, via the ARC communications 1840 will report the viewing information to the ARC database 1845. The ARC database 1845 will store the viewing information as a separate data entry, as well as within the ARC profile itself, tracking and recording such activities as view date, view time, view duration, user ID viewing the digital content 1825, and other data points controlling and managing the digital content 1825 via the ARC profile.

Upon completion of the digital content 1825 viewing, the temporary and direct link between the recipient device 1860 and the digital content 1825 is terminated, and the ARC profile is updated to complete and store the collection of access data within the ARC profile. If the recipient device 1860 were to initiate another session with the current ARC profile, the validation and identification process disclosed above would start all over again, ensuring the security of the ARC profile.

In instances wherein the recipient device 1860 tries to forward or transfer ARC profile information they received via text, email, chat, or other methodology with a third party, the ARC profile would maintain the existing controls and permissions, and respond to the access attempt by a third party based on the provisions originally set by the digital content owner 1801 during the creation of the ARC profile (as discussed in FIG. 17.). As an example, if the current ARC profile is set to view-only and requires recipient identification, attempts by a third party to access the digital content 1825 would be rejected by the ARC operating system 1830.

As stated previously (during the discussion with reference to FIG. 17) the ARC tracks the location information of the digital content being protected and managed within the ARC. Subsequently, attempts to access the ARC profile from non-authorized third party devices, persons, locations, networks, or other would be denied, as they would not match the strict parameters and controls defined by the digital content owner 1801 during creation of the ARC profile (as discussed with reference to FIG. 17). The ARC prevents forwarding, sharing, and unauthorized access to private digital content 1825 that is managed within the ARC operating system 1830.

It is important to note that other digital content residing on the host device 1820 is not accessible to the recipient device 1860, even though the subject digital content 1825 is open and accepting a view request from the recipient device 1860. Further, the current view request as described above is subject to the other conditions and parameters placed on the digital content 1825 through the creation of the ARC profile as discussed previously. These parameters include, but are not limited to, expiration time and date, number of views allowed, the duration of a viewing session, and the like.

The ARC provides digital content owners the capability of both managing and protecting their digital content within a digital realm. This protection can extend beyond local area networks, local servers, and registered users to networks, realms, and users that exist outside a system hosting the ARC. Protection can be provisioned by person or by groups of persons. Protection can also be actively modified at any time during the life cycle of an active ARC profile. As an example, if an ARC profile is accessed by a recipient and the digital content owner at a later date decides to withdraw the access and permissions from the recipient, they can do so at any time during the life of the subject ARC profile. Moreover, if an ARC profile is transferred to, or otherwise accessible by, a group of recipients, the removal of access rights and permissions from one recipient will not affect the remaining recipients. The ARC profile is designed to give the digital content owner complete control over their digital content, even after it has been accessed by one or more recipients.

What is claimed is:

1. A method for providing remote access to digital content between a user and a recipient performed by one or more processors, the method comprising:
   receiving digital content data including one or more attributes of a digital content file via one or more communication devices and generating a first block with the digital content data;
   upon storage or movement of the digital content file at one or more host devices, receiving location information identifying the location of the digital content file on the one or more host devices and generating a second block with the location information, wherein the one or more host devices are one or more user devices remote from the one or more processors;
   receiving recipient information via the one or more communication devices and generating a third block that includes the recipient information;
   receiving one or more usage permissions for the digital content file and generating a fourth block with the usage criteria; and upon storage or movement of the digital content file at the one or more host devices, generating an asynchronously rendered conduit (ARC) profile comprising the first block, the second block, the third block, and the fourth block appended together;

wherein the digital content data, the recipient information and the one or more usage permissions are received from the user via the one or more host devices;

wherein one or more recipient devices:
  receive the ARC profile and read each block in the ARC profile;
  receive identification information from the recipient; and
  allow access to the digital content file at the one or more host devices according to the location information and the one or more usage permissions when the identification information matches the recipient information.

2. The digital content storage and access method of claim 1 receiving a message via the one or more communication devices and generating a fifth block with the message, wherein the ARC profile includes the fifth block.

3. The digital content storage and access method of claim 2, wherein the one or more recipient devices display the message when the identification information matches the recipient information.

4. The digital content storage and access method of claim 1 further comprising encrypting the ARC profile.

5. The digital content storage and access method of claim 1, wherein the one or more usage permissions include an expiration for the digital content file.

6. The digital content storage and access method of claim 1 further comprising storing the ARC profile in a database.

7. The digital content storage and access method of claim 1, wherein the one or more recipient devices present the digital content data to the recipient.

8. A method for providing remote access to digital content between a user and a recipient performed by one or more processors, the method comprising:
  generating a first block comprising digital content data including one or more attributes of a digital content file;
  upon storage or movement of the digital content file at one or more host devices, generating a second block comprising location information identifying the location of the digital content file on the one or more host devices, wherein the one or more host devices are one or more user devices remote from the one or more processors;
  generating a third block comprising recipient information;
  generating a fourth block comprising one or more usage permissions for the digital content file; and
  upon storage or movement of the digital content file at the one or more host devices, appending the first block, the second block, the third block, and the fourth block together to generate a profile;
  wherein the digital content data, the recipient information, and the one or more usage permissions are received from the user via the one or more host devices;
  wherein one or more recipient devices:
    receive the profile;
    receive identification information from the recipient;
    verify the identification information based on the recipient information; and
    allow access to the digital content file at the one or more host devices according to the location information and the one or more usage permissions, and present the digital content file to the recipient via a display device when the identification information is verified.

9. The digital content storage and access method of claim 8 further comprising generating a fifth block comprising a message, wherein the profile includes the fifth block.

10. The digital content storage and access method of claim 9, wherein the one or more recipient devices display the message via the display device when the identification information is verified.

11. The digital content storage and access method of claim 8 further comprising encrypting the profile.

12. The digital content storage and access method of claim 8, wherein the one or more usage permissions include an expiration for the digital content file.

13. The digital content storage and access method of claim 8 further comprising notifying an owner of the digital content file when the identification information is verified.

14. The digital content storage and access method of claim 8, wherein the one or more recipient devices present the digital content data to the recipient.

15. A digital content storage and access system for providing remote access to digital content between a user and a recipient comprising:
  one or more host devices comprising one or more storage devices that store one or more digital content files, wherein the one or more host devices are one or more user devices remote from the digital content storage and access system;
  one or more databases storing a plurality of profiles;
  one or more processors that, upon storage or movement of the one or more digital content file at the one or more host devices, generate each of the plurality of profiles by:
    generating a first block comprising digital content data including one or more attributes of the one or more digital content files;
    generating a second block comprising location information identifying the location of the one or more digital content files on the one or more host devices;
    generating a third block comprising recipient information;
    generating a fourth block comprising one or more usage permissions for the one or more digital content files; and
    appending the first block, the second block, the third block, and the fourth block together to generate a profile;
  one or more communication devices that receive the digital content data, the location information, the recipient information, and the one or more usage permissions, wherein the digital content data, the recipient information, and the one or more usage permissions are received from the user via the one or more host devices; and
  one or more recipient devices that:
    receive one or more of the plurality of profiles;
    receive identification information from the recipient;
    verify the identification information based on the recipient information; and
    allow access to the one or more digital content files at the one or more host devices according to the location information and the one or more usage permissions, and present the one or more digital content files to the recipient via a display when the identification information is verified.

16. The digital content storage and access system of claim 15 further comprising generating a fifth block comprising a message, wherein the plurality of profiles include the fifth block.

17. The digital content storage and access system of claim 16, wherein the one or more recipient devices display the message via the display device when the identification information is verified.

18. The digital content storage and access system of claim 15, wherein the one or more processors encrypt the plurality of profiles.

19. The digital content storage and access system of claim 15, wherein the one or more usage permissions include an expiration for the one or more digital content file.

20. The digital content storage and access system of claim 15, wherein the one or more recipient devices transmit an access notification when the identification is verified.

* * * * *